United States Patent
Fujita et al.

(10) Patent No.: US 6,681,394 B1
(45) Date of Patent: Jan. 20, 2004

(54) BROADCAST TRANSMITTING APPARATUS, RECEIVING APPARATUS, AND BROADCAST TRANSMITTING METHOD, RECEIVING METHOD

(75) Inventors: Mitsuko Fujita, Tokyo (JP); Hiroki Shinohara, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/535,127

(22) Filed: Mar. 24, 2000

(30) Foreign Application Priority Data

Mar. 24, 1999 (JP) .......................... 11-080347

(51) Int. Cl.⁷ .................... H04N 7/025; H04N 7/10; H04N 5/445; H04N 7/173; H04N 7/16; G06F 3/00; G06F 13/00

(52) U.S. Cl. ..................... 725/32; 725/33; 725/34; 725/35; 725/36; 725/50; 725/54; 725/114; 725/115; 725/116; 725/117; 725/144; 725/145; 725/146; 725/147; 725/148; 725/152

(58) Field of Search ................. 725/32–36, 135–138, 725/144–148, 114–117, 50, 54, 132, 140, 152

(56) References Cited

U.S. PATENT DOCUMENTS

| | | | | |
|---|---|---|---|---|
| 5,027,400 A | * | 6/1991 | Baji et al. ........... | 725/116 |
| 5,099,319 A | * | 3/1992 | Esch et al. .......... | 725/36 |
| 5,283,639 A | * | 2/1994 | Esch et al. .......... | 725/32 |
| 5,412,416 A | * | 5/1995 | Nemirofsky ........ | 725/36 |
| 5,600,573 A | * | 2/1997 | Hendricks et al. .. | 725/109 |
| 5,659,350 A | * | 8/1997 | Hendricks et al. .. | 725/116 |
| 6,266,813 B1 | * | 7/2001 | Ihara .................. | 725/36 |
| 6,271,886 B1 | * | 8/2001 | Nishina et al. ...... | 348/460 |
| 6,378,129 B1 | * | 4/2002 | Zetts .................. | 725/94 |
| 6,389,593 B1 | * | 5/2002 | Yamagishi .......... | 725/9 |
| 6,401,242 B1 | * | 6/2002 | Eyer et al. .......... | 725/35 |
| 6,442,326 B1 | * | 8/2002 | Kaneko .............. | 386/46 |
| 6,460,018 B1 | * | 10/2002 | Kasai et al. ........ | 705/8 |
| 6,526,575 B1 | * | 2/2003 | McCoy et al. ...... | 725/36 |

FOREIGN PATENT DOCUMENTS

| | | |
|---|---|---|
| JP | 9-135391 | 5/1997 |
| JP | 10-79711 | 3/1998 |
| JP | 10-271468 | 10/1998 |
| JP | 10-304321 | 11/1998 |
| JP | 11-66085 | 3/1999 |

* cited by examiner

*Primary Examiner*—John Miller
*Assistant Examiner*—Michael W. Hoye
(74) *Attorney, Agent, or Firm*—RatnerPrestia

(57) ABSTRACT

A broadcast transmitting apparatus stores and manages the material for composing a broadcast program as AV data, creates storing control information showing a process control method when storing this AV data in a broadcast receiving apparatus, and storing management information showing management information during storing, and registers them as reference information and stores and manages, and transmits according to schedule information managing the schedule of the broadcast program. On the other hand, the broadcast receiving apparatus executes an storing control command according to the storing control information, and stores and manages the AV data according to the storing management information. Further, the broadcast transmitting apparatus creates application information from the reference information being stored and managed, and transmits it together with service application for executing broadcast program service. Receiving them, the broadcast receiving apparatus extracts the corresponding AV data from the stored and managed AV data according to the application information, and executes the service application. By such processing, the transmitting apparatus can control the AV data to be stored in the receiving apparatus, and the broadcast program service using it.

7 Claims, 23 Drawing Sheets

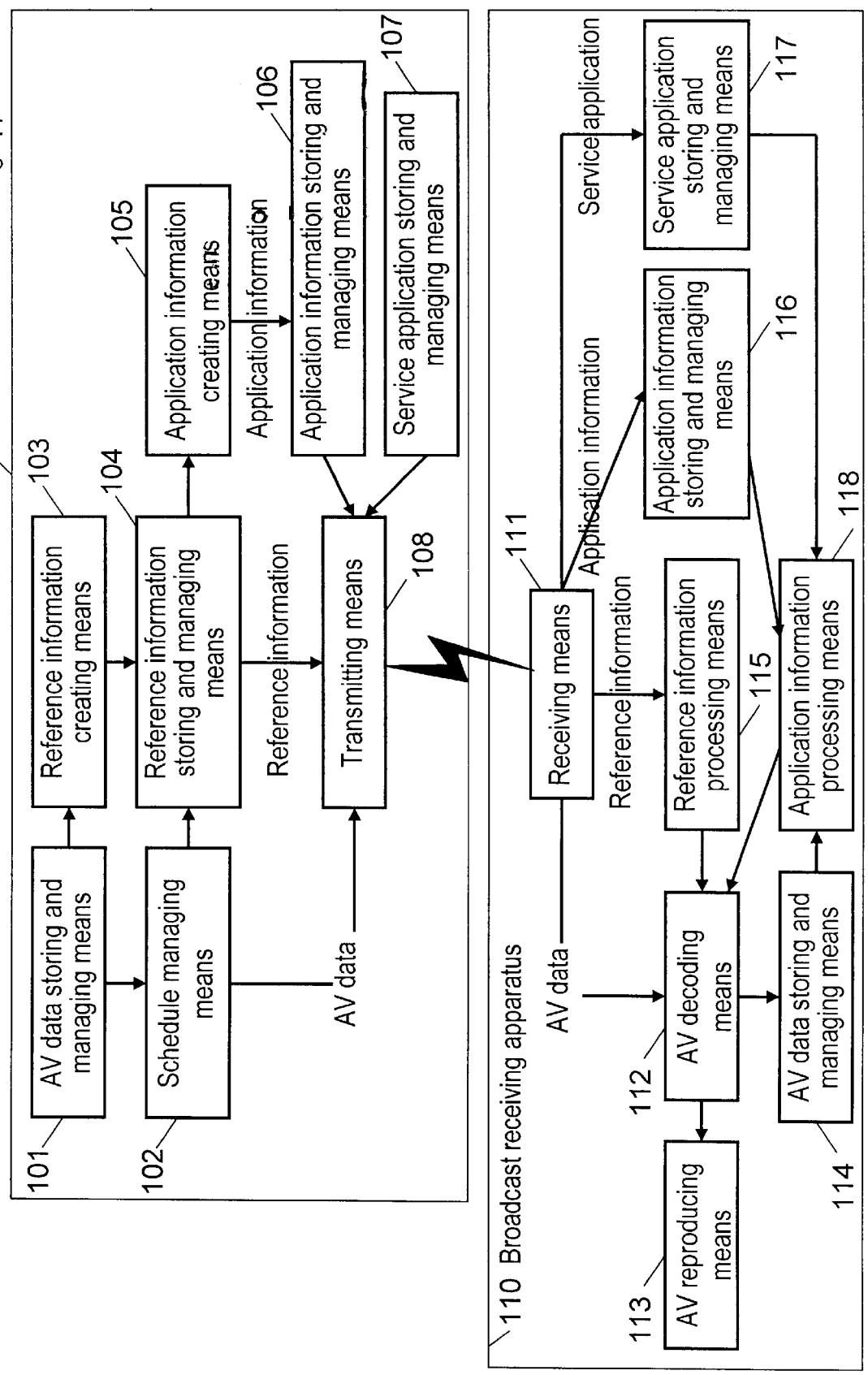

FIG. 2

AV data attribute information (201)

| Data identifier | 1 | 2 | 3 | 4 | 5 | 6 | 7 | 8 | 9 | 10 | ... |
|---|---|---|---|---|---|---|---|---|---|---|---|
| Data size | 10 | 5 | 20 | 250 | 10 | 250 | 15 | 10 | 5 | 10 | ... |
| Duration | 30 | 15 | 60 | 720 | 15 | 720 | 45 | 30 | 15 | 30 | ... |
| Update information | 1 | 1 | 1 | 1 | 1 | 1 | 1 | 1 | 1 | 1 | ... |
| Group identifier | A | B | C | a | D | a | B | B | C | D | ... |

Schedule information (202)

| Data identifier | 1 | 2 | 3 | 4 | 5 | 6 | 7 | 8 | 9 | 10 | ... |
|---|---|---|---|---|---|---|---|---|---|---|---|
| On-air start time | (10:00:00) (10:14:00) (10:28:00) | (10:00:30) | (10:00:45) | (10:02:00) | (10:01:45) (10:29:15) | (10:16:00) | (10:14:30) | (10:28:30) | (10:15:15) (10:29:00) | (10:15:30) (10:29:30) | ... |

Reference information (203)

| Data identifier | 1 | 2 | 3 | 4 | 5 | 6 | 7 | 8 | 9 | 10 |
|---|---|---|---|---|---|---|---|---|---|---|
| Storing control information (204) | | | | | | | | | | |
| Storing Ready | Size 10 (9:57:00...) | Size 5 (9:57:30) | Size 20 (9:57:45) | Size 250 (9:59:00) | Size 10 (9:58:45...) | Size 250 (10:13:00) | Size 15 (10:11:30) | Size 10 (10:25:30) | Size 5 (10:12:15...) | Size 10 (10:12:30...) |
| Storing Go | 1 (10:00:00...) | 2 (10:00:30) | 3 (10:00:45) | 4 (10:02:00) | 5 (10:01:45) (10:02:00...) | 6 (10:16:00) | 7 (10:14:30) | 8 (10:28:30) | 9 (10:15:15...) | 10 (10:15:30...) |
| Storing Stop | 1→ (10:00:30) | 2→ (10:00:45) | 3→ (10:01:45) | 4→ (10:14:00) | 5→ (10:02:00) | 6→ (10:28:00) | 7→ (10:15:15) | 8→ (10:29:00) | 9→ (10:15:30) | 10→ (10:16:00) |
| Storing management information (205) | | | | | | | | | | |
| Data name | A1 | B1 | C1 | a1 | D1 | a2 | B2 | B3 | C2 | D2 |
| Update information | 1 | 1 | 1 | 1 | 1 | 1 | 1 | 1 | 1 | 1 |
| Duration | 30 | 15 | 60 | 720 | 15 | 720 | 45 | 30 | 15 | 30 |
| On-air start time | (10:00:00) (10:14:00) (10:28:00) | (10:00:30) | (10:00:45) | (10:02:00) | (10:01:45) (10:29:15) | (10:16:00) | (10:14:30) | (10:28:30) | (10:15:15) (10:29:00) | (10:15:30) (10:29:30) |

FIG. 7

Application information (10:00 to 10:30) — 701

| Program information | Drama (a) |
|---|---|
| Broadcast information | A1,B1,C1,D1,a1,A1,B2,C2,D2,a2,A1,B3,C2,D1,D2 |

Broadcast program service information — 702

- Service information
- Processing information

Rerun program service application information — 703

| Program information | Drama (a) |
|---|---|
| Broadcast information | A1,B1,C1,D1,a1,A1,B2,C2,D2,a2,A1,B3,C2,D1,D2 |
| Service information | Rerun program service |
| Processing information | On-air time: 1999/01/01 11:00:00 |

CM shortened broadcast program service application information — 704

| Program information | Drama (a) |
|---|---|
| Broadcast information | A1,B1,C1,D1,a1,A1,B2,C2,D2,a2,A1,B3,C2,D1,D2 |
| Service information | CM shortened broadcast program service |
| Processing information | A, B, C, D |

CM mid-program broadcasting service application information — 705

| Program information | Drama (a) |
|---|---|
| Broadcast information | A1,B1,C1,D1,a1,A1,B2,C2,D2,a2,A1,B3,C2,D1,D2 |
| Service information | CM mid-program broadcasting service |
| Processing information | Priority order: Broadcasting sequence On-air start time: a1 480 |

CM long-short time broadcast program service application information — 706

| Program information | Drama (a) |
|---|---|
| Broadcast information | A1,B1,C1,D1,a1,A1,B2,C2,D2,a2,A1,B3,C2,D1,D2 |
| Service information | CM long-short time broadcast program service |
| Processing information | Priority order: MAX to MIN of A, B, C, D |

CM short-long time broadcast program service application information — 707

| Program information | Drama (a) |
|---|---|
| Broadcast information | A1,B1,C1,D1,a1,A1,B2,C2,D2,a2,A1,B3,C2,D1,D2 |
| Service information | CM short-long time broadcast program service |
| Processing information | Priority order: MIN to MAX of A, B, C, D |

CM delete broadcast program service application information — 708

| Program information | Drama (a) |
|---|---|
| Broadcast information | A1,B1,C1,D1,a1,A1,B2,C2,D2,a2,A1,B3,C2,D1,D2 |
| Service information | CM delete broadcast program service |
| Processing information | A1, B1, C1, D1 |

CM one-time reproduction broadcast program service application information — 709

| Program information | Drama (a) |
|---|---|
| Broadcast information | A1,B1,C1,D1,a1,A1,B2,C2,D2,a2,A1,B3,C2,D1,D2 |
| Service information | CM one-time reproduction broadcast program service |
| Processing information | Reproduction start time: 0 |

Sent CM delete broadcast program service application information — 710

| Program information | Drama (a) |
|---|---|
| Broadcast information | A1,B1,C1,D1,a1,A1,B2,C2,D2,a2,A1,B3,C2,D1,D2 |
| Service information | Sent CM delete broadcast program service |
| Processing information | A, B, C, D |

Automatic tuning storing broadcast program service application information — 711

| Program information | Drama (a) |
|---|---|
| Broadcast information | A1,B1,C1,D1,a1,A1,B2,C2,D2,a2,A1,B3,C2,D1,D2 |
| Service information | Automatic tuning accumulation broadcast program service |
| Processing information | ch: 1, on-air time: 1999/01/01 10:00:00 |

FIG. 10

Storing management information

| Data name | A1 | B1 | C1 | a1 | D1 | a2 | B2 | B3 | C2 | D2 |
|---|---|---|---|---|---|---|---|---|---|---|
| Update information | 1 | 1 | 1 | 1 | 1 | 1 | 1 | 1 | 1 | 1 |
| Duration | 30 | 15 | 60 | 720 | 15 | 720 | 45 | 30 | 15 | 30 |
| On-air start time | (10:00:00) (10:14:00) (10:28:00) | (10:00:30) | (10:00:45) | (10:02:00) | (10:01:45) (10:29:15) | (10:16:00) | (10:14:30) | (10:28:30) | (10:15:15) (10:29:00) | (10:15:30) (10:29:30) |

After first broadcast

Storing management information

| Data name | A1 | B1 | C1 | a1 | D1 | a2 | B2 | B3 | C2 | D2 |
|---|---|---|---|---|---|---|---|---|---|---|
| Update information | 1 | 1 | 1 | 1 | 1 | 1 | 1 | 1 | 1 | 1 |
| Duration | 30 | 15 | 60 | 720 | 15 | 720 | 45 | 30 | 15 | 30 |
| On-air start time | (10:00:00) (10:14:00) (10:28:00) | (10:00:30) | (10:00:45) | (10:02:00) | (10:01:45) (10:29:15) | (10:16:00) | (10:14:30) | (10:28:30) | (10:15:15) (10:29:00) | (10:15:30) (10:29:30) |
| User information | CM one-time reproduction | CM one-time reproduction | CM one-time reproduction | CM one-time reproduction | CM one-time reproduction | | | | | |

After second broadcast

Storing management information

| Data name | A1 | B1 | C1 | a1 | D1 | a2 | B2 | B3 | C2 | D2 |
|---|---|---|---|---|---|---|---|---|---|---|
| Update information | 1 | 1 | 1 | 1 | 1 | 1 | 1 | 1 | 1 | 1 |
| Duration | 30 | 15 | 60 | 720 | 15 | 720 | 45 | 30 | 15 | 30 |
| On-air start time | (10:00:00) (10:14:00) (10:28:00) | (10:00:30) | (10:00:45) | (10:02:00) | (10:01:45) (10:29:15) | (10:16:00) | (10:14:30) | (10:28:30) | (10:15:15) (10:29:00) | (10:15:30) (10:29:30) |
| User information | CM one-time reproduction | CM one-time reproduction | CM one-time reproduction | CM one-time reproduction | CM one-time reproduction | CM one-time reproduction | CM one-time reproduction | | CM one-time reproduction | CM one-time reproduction |

FIG. 11

CM one-time broadcast program service application information 1101

| Program information | Drama (a) |
|---|---|
| Broadcast information | A1,B1,C1,D1,a1,A1,B2,C2,D2,a2,A1,B3,C2,D1,D2 |
| Service information | CM one-time reproduction broadcast program service |
| Processing information | Reproduction start time: 0 |

After first broadcast 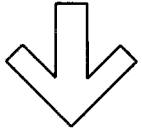

CM one-time broadcast program service application information 1102

| Program information | Drama (a) |
|---|---|
| Broadcast information | A1,B1,C1,D1,a1,A1,B2,C2,D2,a2,A1,B3,C2,D1,D2 |
| Service information | CM one-time reproduction broadcast program service |
| Processing information | Reproduction start time: a1 480 |

After second broadcast 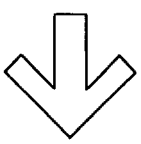

CM one-time broadcast program service application information 1103

| Program information | Drama (a) |
|---|---|
| Broadcast information | A1,B1,C1,D1,a1,A1,B2,C2,D2,a2,A1,B3,C2,D1,D2 |
| Service information | CM one-time reproduction broadcast program service |
| Processing information | Reproduction start time: a2 270 |

BROADCAST TRANSMITTING APPARATUS, RECEIVING APPARATUS, AND BROADCAST TRANSMITTING METHOD, RECEIVING METHOD

FIELD OF THE INVENTION

The present invention relates to a broadcast transmitting apparatus, a receiving apparatus, a broadcast transmitting method and a receiving method for a broadcasting system, in which a receiving side stores and reproduces the programs sent from a transmitting side. Particularly, this invention relates to the broadcast transmitting and the receiving apparatuses and methods of a system for enabling a transmitter to control the storing and the reproducing activities of a receiver.

BACKGROUND OF THE INVENTION

Recently, with the advancement in communication technology and data processing technology, multimedia information such as audio information and visual information has come to be presented to the user in digital form, and as a result of introduction of memory medium with large capacity, it is going to realize a broadcasting system capable of transmitting a huge quantity of data by using broadcasting or communication equipment, receiving and storing in a terminal device at user side, and viewing at a desired timing.

Such broadcasting system is disclosed, for example, in Japanese Laid-open Patent No. 9-135391. In this broadcasting system, after a highlight scene of a broadcast program is transmitted, segment information relating to the highlight scene is transmitted as additional information simultaneously with the live broadcast program. The receiving apparatus always stores the live broadcast program in a storing device, and when the segment information indicating the segment of highlight scene is detected, only the corresponding highlight scene is re-stored from the broadcast programs in the storing device. Thus, the re-stored highlight scene can be reproduced and viewed whenever desired.

In the broadcasting system disclosed in Japanese Laid-open Patent No. 10-304321, a broadcast transmitting apparatus transmits a broadcast program and additional information at the same time, and a receiving apparatus stores the broadcast program and the additional information together. In this system, with an instruction from the viewer, information about the broadcast program can be viewed from the receiving apparatus, the broadcast program can be viewed repeatedly, and other varied and efficient viewing services are available such as shortened viewing and variable viewing.

In these broadcasting systems, the transmitting side send parameter as additional information processable by a program prepared in a receiving apparatus together with broadcast programs., Then the receiving apparatus stores the data and executes the program. In this system, the viewer has controls over the program, and the service according to the preference of the viewer can be presented. It is therefore difficult for the transmitting side to control the program and to present the broadcast program service suited on the basis of their intent.

SUMMARY OF THE INVENTION

Hence an object of the invention is to present a broadcast transmitting apparatus and a receiving apparatus in which a transmitting side(party) has a control for such activities as transmitting AV data using the transmitting apparatus, storing the AV data in the receiving apparatus and executing various broadcast services at the receiving side by using the stored AV data.

The broadcast transmitting apparatus comprises means for storing and managing AV data including video or audio, and its attribute for managing the AV data, means for managing the on-air schedule, means for creating reference information, and means for storing and managing the reference information. The AV data and the reference information are transmitted. The reference information creating means reads the attribute data of the AV data from the AV data storing and managing means, and reads the schedule information from the schedule managing means, then creates the AV data storing control information showing the processing and controlling method when storing the received AV data in a receiving apparatus, and creates the AV data storing management information showing the management information when storing the AV data at the receiving side.

The transmitting apparatus further comprises application information creating means for creating application information showing how to use the AV data in the service application for executing the broadcast program service from the reference information, and application information storing and managing means for storing and managing the application information and controlling its transmission. It moreover comprises service application storing and managing means for storing and managing the service application and controlling its transmission, and transmitting means for transmitting the application information issued from the application information storing and managing means and the service application issued from the service application storing and managing means.

The broadcast receiving apparatus comprises receiving means for receiving a broadcast program, separating the program, and extracting AV data and reference information, AV decoding means for taking the AV data into an inner buffer and decoding the AV data therein, AV reproducing means for reproducing the AV data, reference information processing means for controlling AV data storing according to the storing control information of the reference information, and AV data storing and managing means for storing and managing the AV data together with the storing management information of the reference information.

In this constitution, the broadcast transmitting apparatus creates information for managing the AV data of broadcast program to be stored in the broadcast receiving apparatus, broadcasts together with AV data, and stores the AV data in the broadcast receiving apparatus according to the schedule of broadcast program.

The broadcast transmitting apparatus further creates application information from the reference information being stored and managed, and transmits the application information together with the service application for executing the broadcast program service. Receiving them, the broadcast receiving apparatus extracts the corresponding AV data from the AV data being stored and managed according to the application information, and executes the service application. In this way, the transmitting side have control over the receiving side to present the broadcast program to meet the transmitter's intention.

BRIEF DESCRIPTION OF THE DRAWINGS

FIG. 1 is a block diagram showing a basic constitution of a broadcast transmitting apparatus and its receiving apparatus of the invention, FIG. 2 is a diagram showing data created by reference information creating means of the invention, FIG. 7 is a diagram showing data created by application information creating means from service application of the invention, FIG. 10 is a diagram showing data stored and managed by AV data storing and managing means in the sixth embodiment of the invention, FIG. 11 is a diagram showing data crated by application information processing means in the sixth embodiment of the invention.

DETAILED DESCRIPTION OF THE PREFERRED EMBODIMENTS

First Exemplary Embodiment

Figure 3:
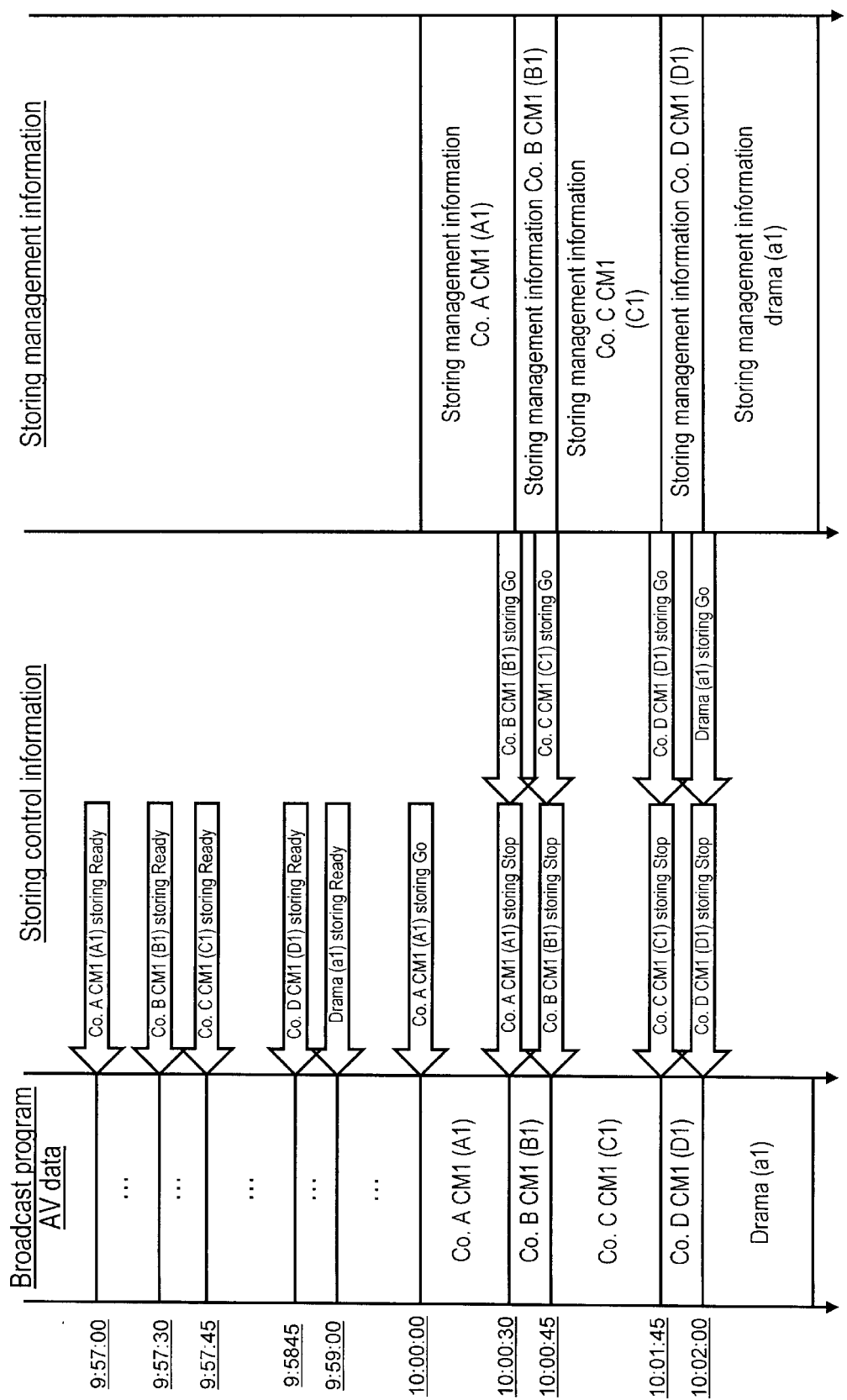
FIG. 3 is a diagram showing data transmitted from the broadcast transmitting apparatus to the broadcast receiving apparatus of the invention.

An embodiment of the invention is described below by referring to the accompanying drawings.

A broadcasting system of the first embodiment comprises, as shown in FIG. 1, a broadcast transmitting apparatus 100 for transmitting a broadcast program, and a broadcast receiving apparatus 110 for receiving the broadcast program. The broadcast transmitting apparatus 100 broadcasts signals having reference information and AV data which comprises broadcast program materials such as video and audio and additional data. The broadcast receiving apparatus 110, when receiving and storing the AV data, controls the AV data storing in accordance with the reference information. Also controlling the reproduction of the stored AV data, the broadcast receiving apparatus provides the broadcast program service intended by the broadcast program service.

The broadcast transmitting apparatus 100 comprises AV data storing and managing means 101 for storing and managing broadcast program materials as AV data, schedule managing means 102 for creating schedule of broadcast programs and managing, reference information creating means 103 for creating storage control information showing a process control method when storing the AV data of broadcast programs in a broadcast receiving apparatus 110, and storage management information showing management information of the AV data being stored, and registering as reference information, reference information storing and managing means 104 for storing and managing the reference information created by the reference information creating means 103, application information creating means 105 for creating application information, application information storing and managing means 106 for storing and managing the application information created by the application information creating means 105, service application storing and managing means 107 for storing and managing the service application, and transmitting means 108 for transmitting data to the broadcast receiving apparatus 110.

On the other hand, the broadcast receiving apparatus 110 comprises receiving means 111 for data transmitted from the transmitting means 108, AV decoding means 112 taking the received AV data and decoding, AV reproducing means 113 for reproducing the AV data issued form the AV decoding means 112, AV data storing and managing means 114 for storing and managing AV data, reference information processing means 115 for processing on the basis of the received reference information, application information storing and managing means 116 for storing and managing the received application information, service application storing and managing means 117 for storing and managing the received service application, and application information processing means 118 for processing the application.

The operation of this broadcasting system is explained below by referring to FIGS. 1, 2, 3, 12, 13, 14, and 15.

Transmitting side AV data storing and managing means 101 of the broadcast transmitting apparatus 100 stores and manages the AV data comprising audio and video for forming the broadcast program, and AV data attribute information showing its attribution. The AV data attribute information 201 shown in FIG. 2 is composed of data identifier, data size, duration, update information such as version information and the like and group identifier.

The data identifier includes video identifier, audio identifier, signal identifier, code identifier, and time identifier, which are identifiers designed uniquely in the system, whereas the group identifier is an identifier designed to be a unique group in the system.

Schedule managing means 102 creates schedule information 202, by combining information such as on-air start time and the AV data attribute information, in order to create the schedule of broadcast program, and manages by making use of the data identifier. In the term of data identifier 1 of schedule information in FIG. 2, it shows that the broadcast of the material is started at 10:00:00, 10:14:00, and 10:28:00.

Reference information creating means 103 of the broadcast transmitting apparatus 100 creates reference information for storing the AV data of broadcast program in the broadcast receiving apparatus 110.

Figure 12:
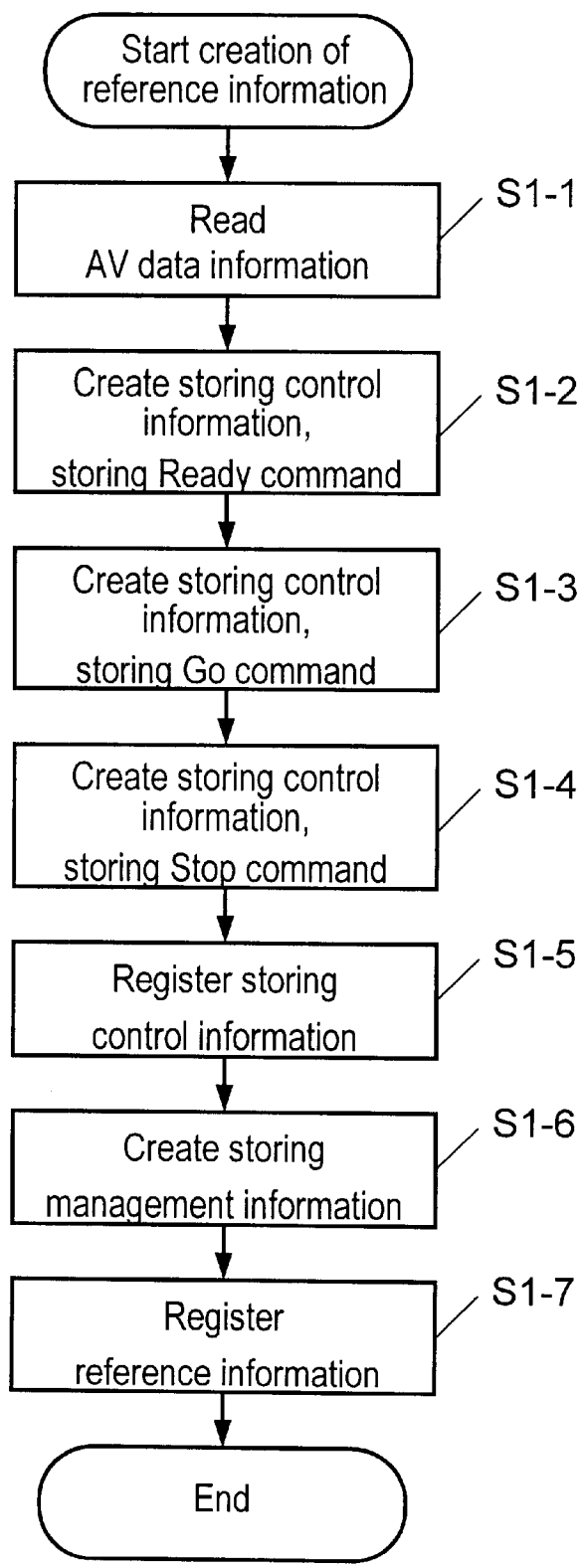
FIG. 12 is a flowchart showing reference information creating process in the first embodiment of the invention.

A flowchart of this process is shown in FIG. 12, and the created reference information 203 is shown in FIG. 2.

The reference information creating means 103 first creates, of the reference information, storing control information showing a processing control method when storing AV data of broadcast program in the broadcast receiving apparatus, then creates storing management information showing management information when storing the AV data of broadcast program in the broadcast receiving apparatus.

Step S1-1: The reference information creating means 103, in order to create storing control information, reads out the data size registered in the AV data attribute information 201 and the on-air start time registered in the schedule information 202.

Step S1-2: A storing Ready command is created. This command is a storing control command for preparing for storing AV data before its on-air start time (3 minutes before herein), and checking if the broadcast receiving apparatus has enough capacity for storing the data size of the AV data.

Step S1-3: An storing Go command is created. This command is a storing control command for starting storing AV data when reaching the on-air start time.

Step S1-4: A storing Stop command is created. This command is a storing control command for stopping storing AV data when the on-air time is over by judging from the broadcast duration registered in the AV data attribute information 201 and the on-air start time registered in the schedule information 202.

Step S1-5: The storing control commands created so far, that is, storing Ready, storing Go and storing Stop commands are registered as storing control information 204.

Step S1-6: Next, in order to create storing management information, the group identifier registered in the AV data attribute information 201 is read out, and information of a specific data name is created for each group identifier, and registered the information in storing management information 205. Moreover, for creating other information, for example, update information, broadcast duration, and on-air start time, corresponding information is read out from the AV data attribute information 201, and registered in the storing management information 205.

Step S1-7: Later, the created storing control information 204 and storing management information 205 are stored and managed as reference information 203 in the reference information storing and managing means 104, by making use of the data identifier of the AV data attribute information 201.

Figure 13:
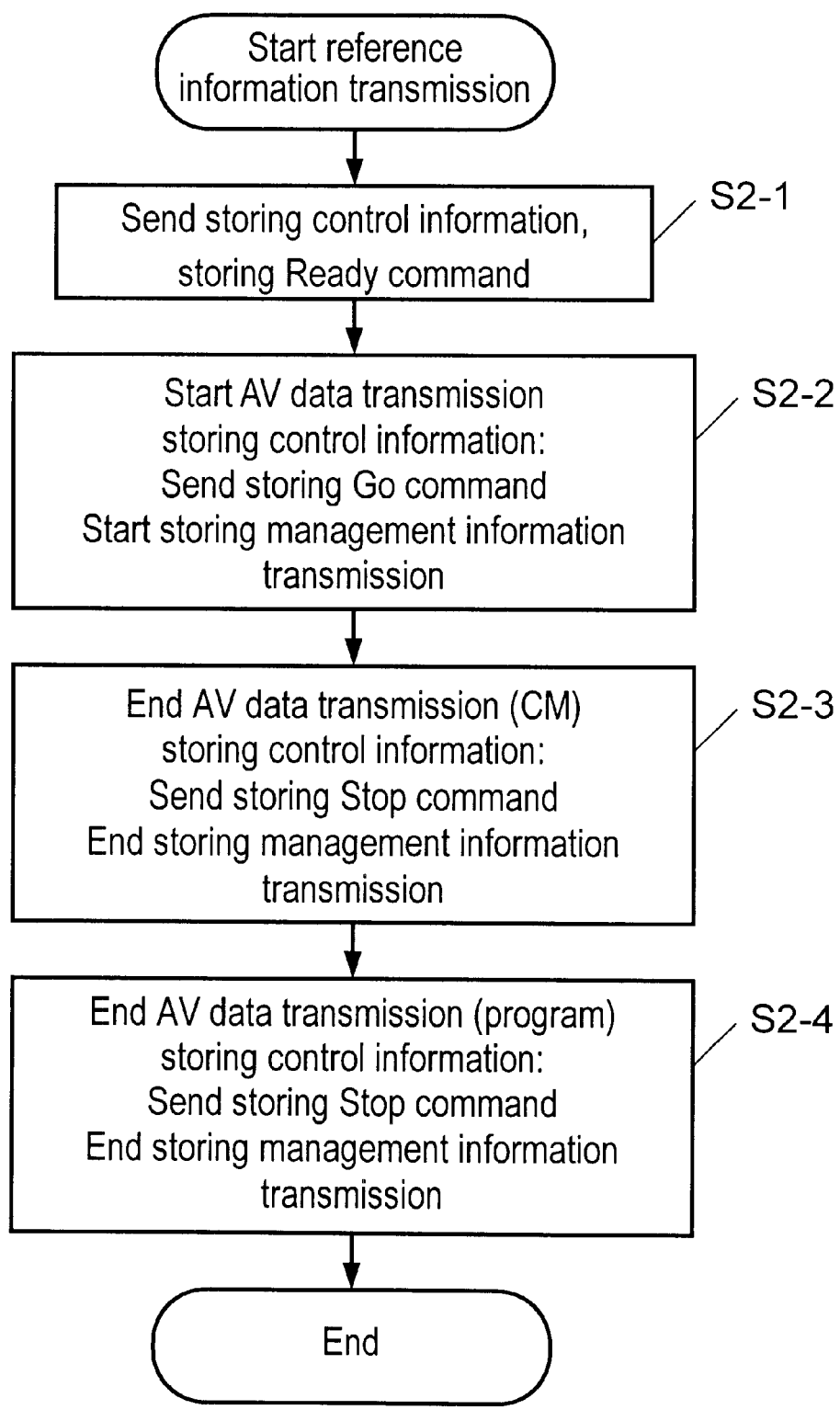
FIG. 13 is a flowchart showing reference information transmitting process in the first embodiment of the invention.

In the next stage, the broadcast transmitting apparatus conducts transmitting activity in the procedure shown in FIG. 3 and FIG. 13, in order to store the AV data of broadcast program in the broadcast receiving apparatus by making use of the created reference information.

FIG. 3 shows how the storing management information and the storing control information are transmitted in order to store the AV data of broadcast program called drama program (a) from 10:00 to 10:30 presented by four companies, A, B, C, D, in the broadcast receiving apparatus. In the diagram, a1 shows a first half of the drama, and A1, B1, C1, D1 indicate the first CM(commercial message) of each company.

Step S2-1: From the storing control information 204 of the reference information 203 stored and managed in the reference information storing and managing means 104, a storing control Ready command is read, and a storing control Ready command for the first CM of Co. A is transmitted at 9:57:00.

In the same manner, first CMs of Co. B, Co. C, Co. D, and the first accumulation control Ready command of drama program (a) are transmitted at 9:57:30, 9:57:45, 9:58:45, and 9:59:00, respectively.

Step S2-2: At 10:00:00, broadcasting of drama program (a) is started, and simultaneously, according to the broadcast program schedule, first, the AV data of the first CM of Co. A is transmitted. At the same time, as reference information, a storing control Go command of the first CM of Co. A and storing management information are transmitted.

Step S2-3: At 10:00:30, broadcasting of the first CM of Co. A is over, and, simultaneously, the transmission of AV data of the first CM of Co. A is terminated. At the same time, as reference information, a storing control Stop command of the first CM of Co. A is transmitted, and transmission of storing management information is terminated.

Thereafter, in the same way, AV data of each first CM of Cos. B, C, D and reference information are transmitted.

Step S2-4: At 10:30:00, broadcasting of drama program (a) is over, and, simultaneously, transmission of AV data of drama program (a) and reference information is terminated.

The operation of storing AV data of a broadcast program in the broadcast receiving apparatus by making use of the reference information transmitted from the broadcast transmitting apparatus is explained below by referring to FIGS. 3, 14 and 15.

Figure 14:
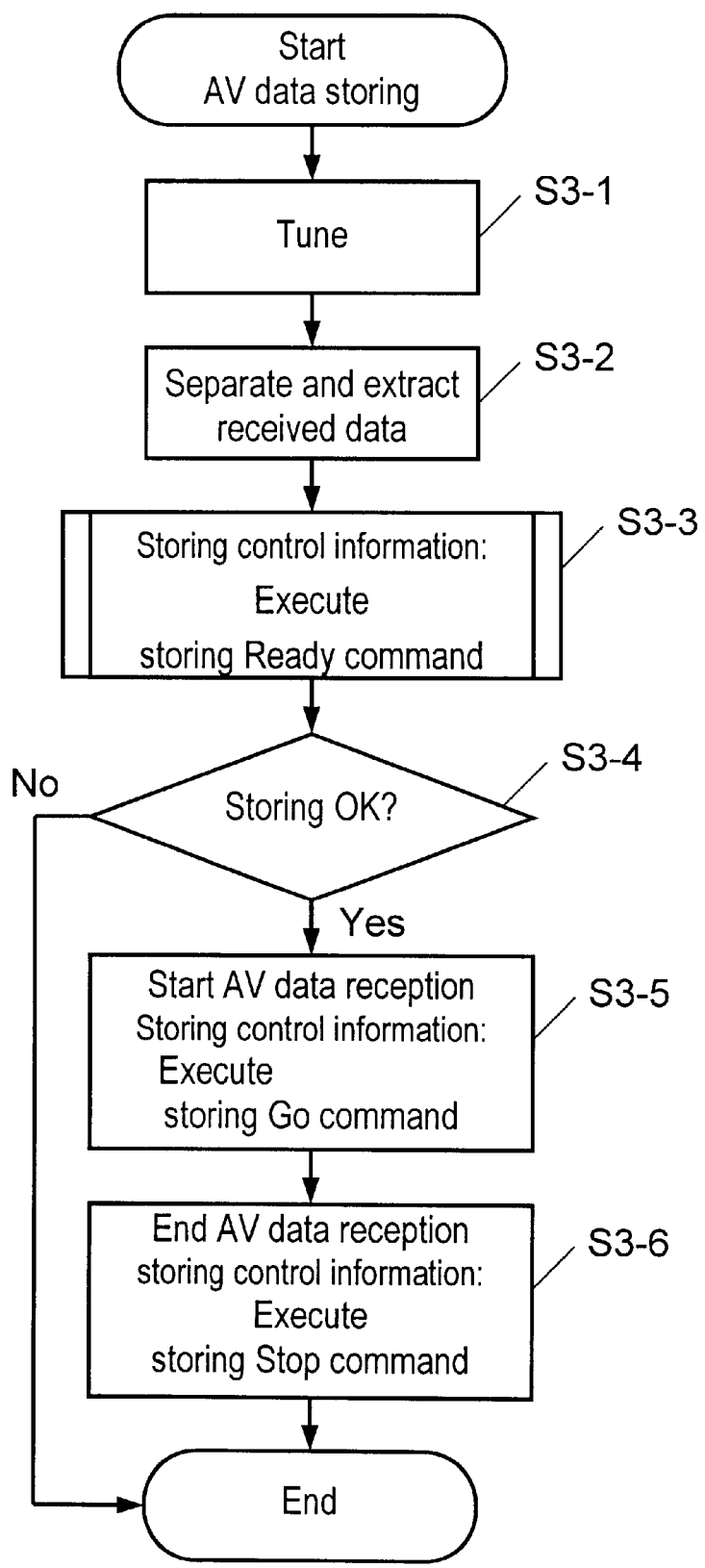
FIG. 14 is a flowchart showing AV data storing process in the first embodiment of the invention.
Figure 15:
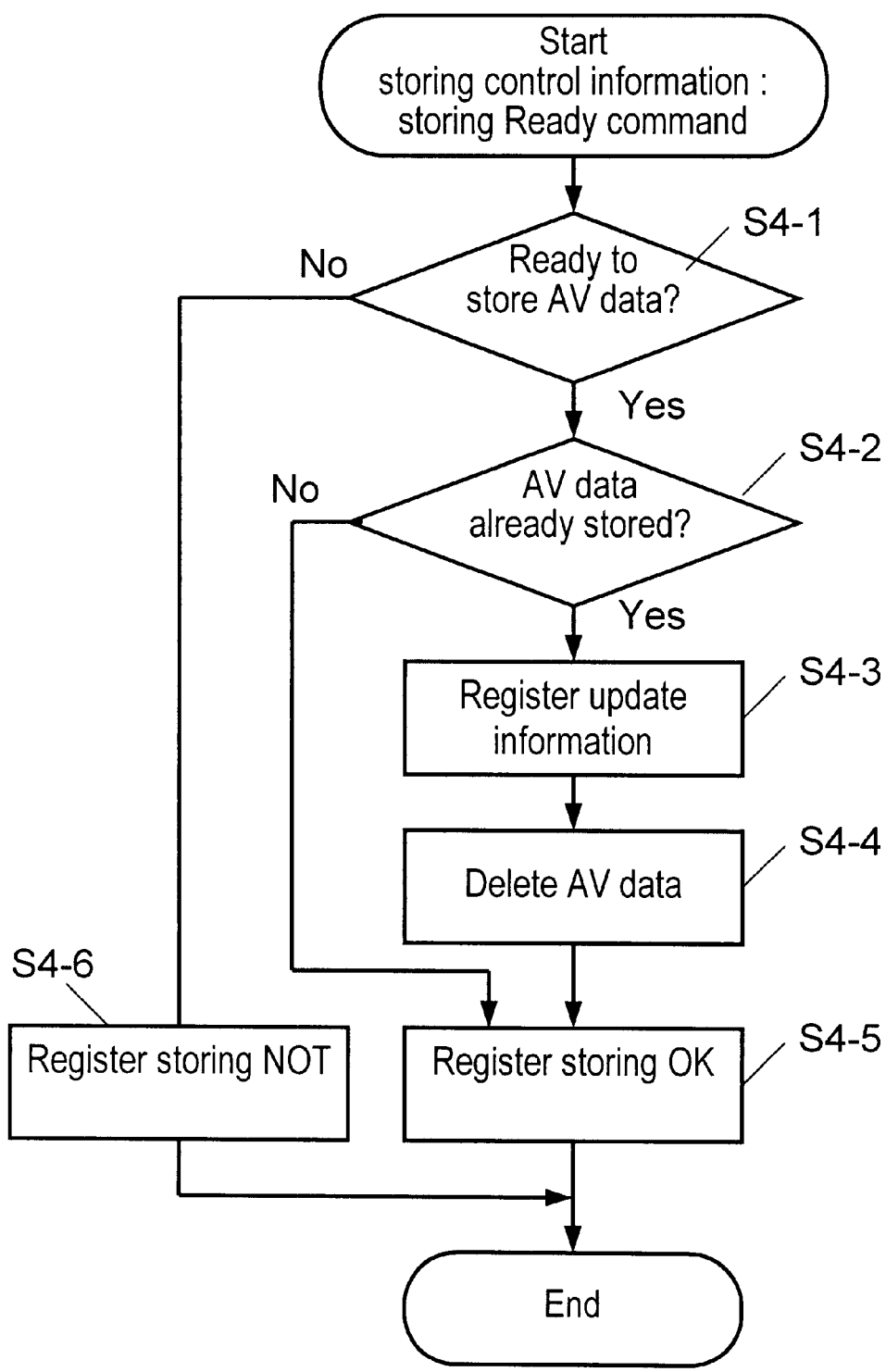
FIG. 15 is a flowchart explaining the details of processing at step S3-3 in FIG. 14.

FIGS. 14 and 15 show the flow of processing in the broadcast receiving apparatus during this stage.

As mentioned above, from the broadcast transmitting apparatus 100, the AV data of broadcast program, and storing control information 204 and storing management information 205 are broadcasted as reference information 203.

Same as in the explanation of transmission, supposing the viewer in viewing the drama program (a) from 10:00 to 10:30 presented by the four companies, A, B, C, D, the operation of storing its AV data in the broadcast receiving apparatus is explained below. In the explanation below, the word, "to tune" is used. Originally the word has been used for the conventional analog televisions, and it implies to select a specific program by "tuning into" the corresponding radio frequency. For convenience's sake, the same word is used for the same action (selecting a specific program) in a digital television in this specification.

Step S3-1: The viewer tunes to the drama program (a) being on-air.

Step S3-2: Receiving means 111 separates and extracts AV data and reference information of the drama program (a), and AV data is sent into AV decoding means 112, and reference information into reference information processing means 115.

Step S3-3: When a storing control Ready command is entered as storing control information of reference information, the reference information processing means 115 executes the storing control Ready command.

The operation at this time is more specifically shown in the flowchart, FIG. 15.

Step S4-1: The reference information processing means 115 executes a storing control Ready command for the first CM of Co. A transmitted at 9:57:00, and checks if the broadcast receiving apparatus 110 has enough capacity for storing the AV data of the first CM of Co. A.

Step S4-2: If possible to store, it confirms if the AV data of the first CM of Co. A has been already stored.

Step S4-3: If the data has already stored, referring to the storing management information of the AV data of the first CM of Co. A, update information, for example, Version information is registered.

Step S4-4: The stored AV data is deleted.

Step S4-5: A storing OK command is issued.

Hereinafter, in the same manner, the first CM of Co. B, Co. C, Co. D, and the first storing control Ready command of the drama program (a) are executed at 9:57:30, 9:57:45, 9:58:45, and 9:59:00, respectively (steps S4-1 to S4-6).

Back to FIG. 14,

Step S3-4: At 10:00:00, when broadcasting of drama program (a) is started, if the storing OK is issued by the storing control Ready command, the reference information processing means 115 processes as follows.

Step S3-5: Executing the storing control Go command of the first CM of Co. A being transmitted, simultaneously, the storing management information of the first CM of Co. A is read, the name of the data is extracted from the storing management information, the extracted data name is used as the file name, and storing the AV data of the first CM of Co. A is started.

Step S3-6: At 10:00:30, when broadcasting of first CM of Co. A is terminated, the storing control Stop command of the first CM of Co. A being transmitted is executed, and storing AV data of the first CM of Co. A is terminated.

In the same way, hereinafter, the AV data is stored until the end of broadcasting of the drama program (a) (steps S3-5 and S3-6).

Thus, the broadcast transmitting apparatus of the embodiment stores and manages the material for composing a broadcast program as AV data, creates storing control information showing the process control method when storing the AV data in the broadcast receiving apparatus and storing management information showing management information of the stored AV data, registers, stores and manages them as reference information, and transmits according to the schedule information managing the schedule of the broadcast program. The broadcast receiving apparatus executes a storing control command according to the storing control information, and stores and manages the AV data according to the storing management information. Through these processes, the broadcast transmitting apparatus creates the information for managing the AV data of the broadcast program to be stored in the broadcast receiving apparatus, broadcasts it together with the AV data, and can store the AV data in the broadcast receiving apparatus according to the schedule of broadcast program.

Further, this storing control information is judged whether it is possible to store the AV data or not. When storing the date is possible, a storing information command is issued, so that the AV data of the broadcast program selected by the broadcast transmitting apparatus can be efficiently stored and managed in the broadcast receiving apparatus.

In this embodiment, the schedule information is managed by the data identifier of the AV data information, but not limited to this, it is possible to execute similarly with any information which is capable of managing the schedule information and AV data information in one-to-one correspondence.

In this embodiment, the preparation time for storing the data by storing Ready command is set to work 3 minutes before the broadcasting time, but not it is not limited. The time may be set freely prior to the broadcasting time.

Also in the embodiment, the information to be registered in the storing management information is the information of data name uniquely designated in each group identifier, update information, broadcast duration, and on-air start time. However these information cannot be limited either. Any other information which can identified the AV data to be stored can be used.

In this embodiment, the reference information is managed by the data identifier of the AV data information, but it is not limited to the example. It is possible to execute similarly with any information which is capable of managing the reference information and AV data information in one-to-one correspondence.

Also in this embodiment, the AV data is stored under the data name of the storing management information, but not limited to this. It is also possible to execute the storing under any other name as far as the AV data to be stored and managed can be specifically identified.

In the embodiment, the storing control command to be registered as storing control information consists of three commands, that is, storing Ready, storing Go, and storing Stop command, but not necessary to limit to these three commands alone. It is similarly possible to execute by using other commands such as storing Pause command which is a storing control command for stopping storing activity temporarily, or storing Restart command which is a storing control command for restarting storing a data.

Second Exemplary Embodiment

A second exemplary embodiment relates to the operation of the broadcast transmitting apparatus in changing the reference information due to the schedule change of a broadcast program.

Figure 16:
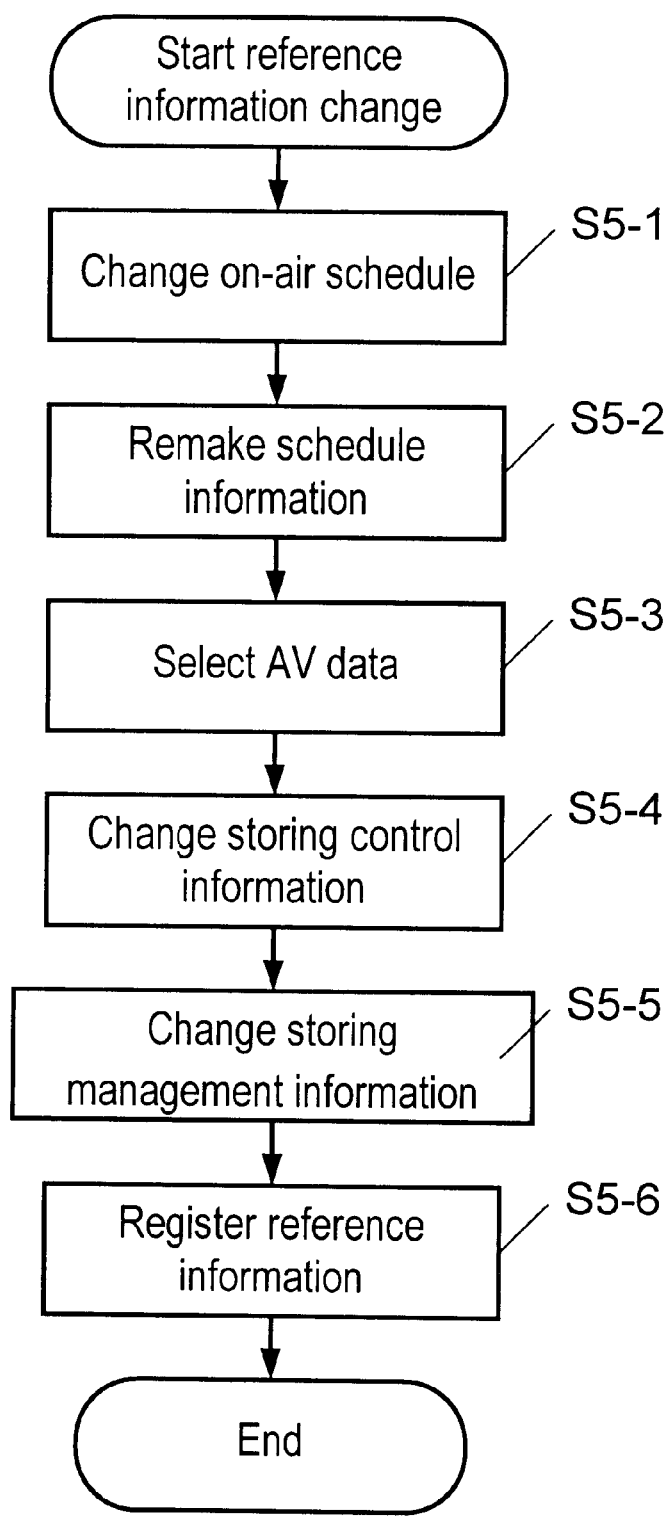
FIG. 16 is a flowchart explaining reference information changing process in the second embodiment of the invention.

FIG. 16 is a flowchart showing the flow of the process for changing the reference information according to the schedule information by the broadcast transmitting apparatus when the schedule of the broadcast program is changed. And the operation is described below while referring to FIGS. 1, 2, 4 and 5 as well.

As explained in the first exemplary embodiment, the reference information storing and managing means 104 stores and manages storing control information 204 and storing management information 205 created in reference information creating means 103 as reference information 203.

As an example, the operation is explained below, where a two-minute urgent news program has to be broadcasted at 10:00:45 in the broadcast program 401 shown in FIG. 4.

Step S5-1: As in a fluid program 402, a two-minute urgent news program is inserted at 10:00:45, and the following programs are scheduled to be sequentially delayed two minutes.

Figure 5:
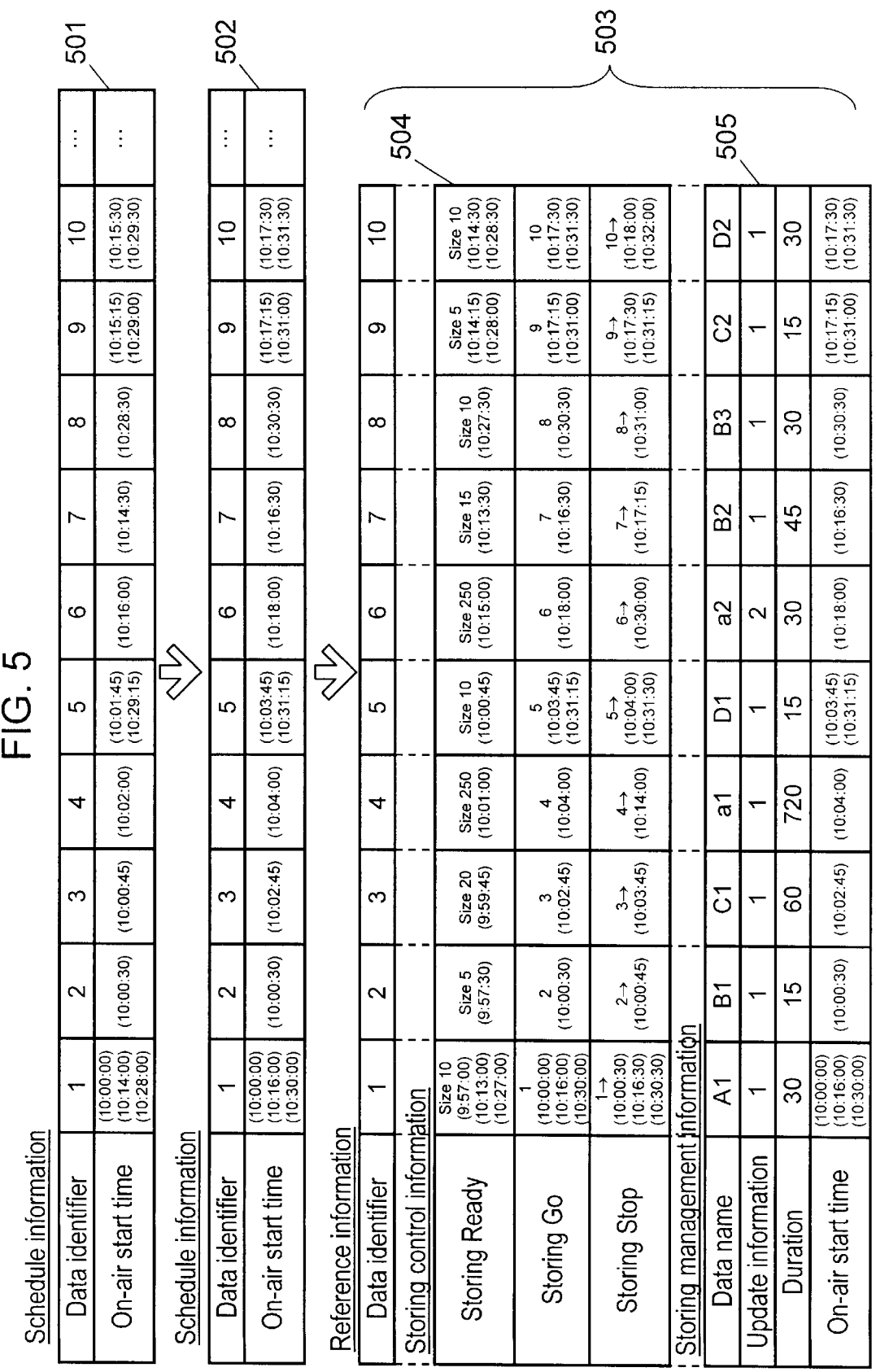
FIG. 5 is a diagram showing data created by reference information creating means in the third embodiment of the invention.

Step S5-2: Schedule managing means 102 creates a new schedule information 502, as shown in FIG. 5, in which the programs after 10:00:45 are scheduled to be on-air being two-minute behind from the original schedule shown in a schedule information 501.

Step S5-3: The reference information storing and managing means 104 extracts the AV data attribute information with the changed schedule in accordance with the schedule change from schedule information 501 to 502.

Step S5-4: Among the reference information 203 being stored and managed, the storing control information of the changed AV data is revised, and storing control information 504 is newly created.

Step S5-5: Among the reference information 203 being stored and managed, the stored management information of the changed AV data is also revised, and storing new management information 505 is created accordingly.

Step S5-6: Then changed reference information 503 is registered.

This embodiment relates to the example of inserting a two-minute urgent news program in the schedule of broadcast programs, but the length of an inserted program is not limited to two minutes. It is possible to execute the operation with inserting or deleting any programs with any duration.

In the embodiment, thus, the broadcast transmitting apparatus further comprises means for changing the reference information being stored and managed according to the schedule information when the schedule of broadcast programs is changed. As a result, if the schedule of broadcast programs is changed due to an urgent news program or the like, it can be handled flexibly at the broadcast transmitting apparatus side without changing the data being stored and managed by the broadcast receiving apparatus.

Third Exemplary Embodiment

A third exemplary embodiment relates to the operation of terminating the schedule of broadcast programs within a broadcasting time frame, by using reference information, when the schedule of broadcast program is changed.

Figure 17:
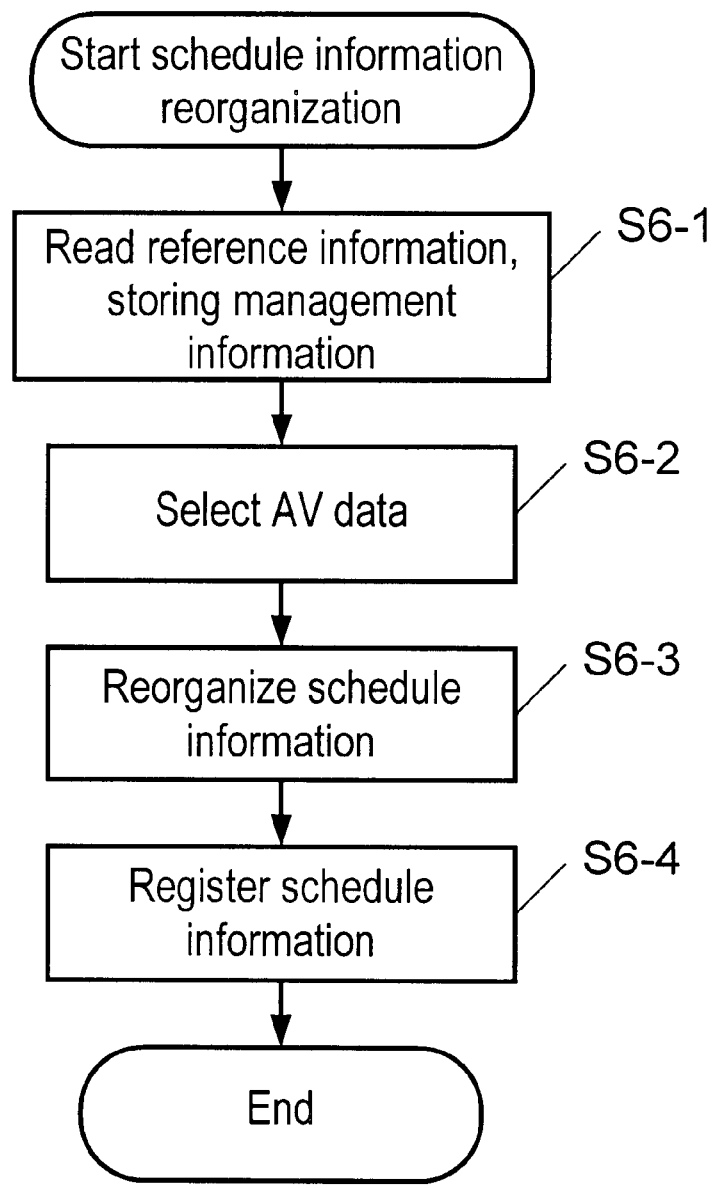
FIG. 17 is a flowchart explaining schedule information reorganizing process in the third embodiment of the invention.

FIG. 17 is a flowchart showing the flow of the process at the broadcast transmitting apparatus during executing the change, and the operation is described below while referring to FIGS. 1, 2 and 4 as well.

As explained in the first exemplary embodiment, the reference information storing and managing means 104 stores and manages the storing control information 204 and storing management information 205 created in the reference information creating means 103 as reference information 203.

Figure 4:
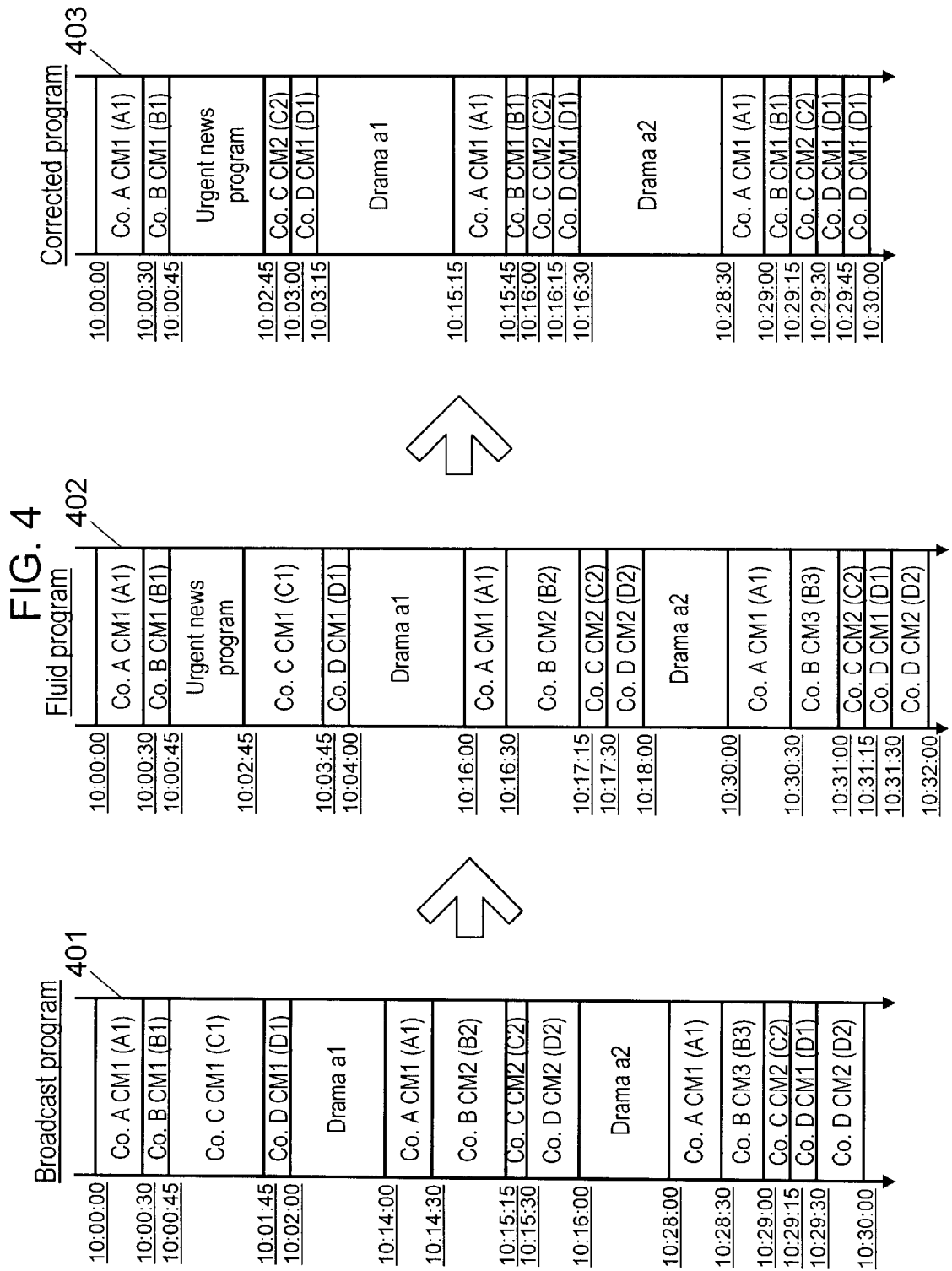
FIG. 4 is a diagram showing data changed by the broadcast transmitting apparatus in the second and the third embodiments of the invention.

In the second exemplary embodiment, in the broadcast program 401 in FIG. 4, if necessary to broadcast a two-minute urgent news program at 10:00:45, this program is inserted, and the following schedule is delayed two minutes by changing the schedule. As a result, the schedule of broadcast programs exceeding the original broadcasting time frame by two minutes is created as in the fluid program 402.

Therefore, the schedule managing means 102 processes in order to finish the broadcasting within the scheduled broadcasting time frame, and the process is explained as follows.

Step S6-1: The storing management information 205 of the reference information 203 stored and managed by the reference information storing and managing means 104 is referred.

Step S6-2: According to the reference, A1, B1, C2, D1 which have the shortest broadcast duration among the CMs of each company A to D are respectably extracted.

Step S6-3: Long duration CM programs of each company are replaced by the extracted AV data A1, B1, C2, D1 of the companies A to D, and the schedule information is reorganized.

Step S6-4: Then a corrected program 403 in FIG. 4 is created.

This embodiment uses an example of inserting a two-minute urgent news program in the schedule of broadcast programs, but it not limited to this example. It is possible to execute the operation with inserting or deleting any programs with any duration.

In this embodiment, thus, the broadcast transmitting apparatus further comprises means for creating the schedule of broadcast program to finish broadcasting within the scheduled broadcasting time frame by using the reference information being stored and managed. As a result, if the schedule of broadcast programs is changed due to a urgent news program or the like, the schedule of broadcast programs can be reorganized to be finished within the originally scheduled broadcasting time frame at the broadcast transmitting apparatus side without changing the data being stored and managed by the broadcast receiving apparatus.

Fourth Exemplary Embodiment

A fourth exemplary embodiment relates to the operation of presenting broadcast program service by using the AV data stored and managed in the broadcast receiving apparatus.

The operation is explained by referring again to the example of broadcast program of drama program (a) from 10:00 to 10:30 presented by four companies A, B, C, D as shown in 401 in FIG. 4. Companies A to D broadcast CM before, during, and after the drama program (a). Co. A broadcasts 30-second CM three times. Co. B broadcasts 30-second, 15-second and 45-second CM once each. Co. C broadcasts 60-second CM once and 15-second CM twice. Co. D broadcasts 15-second CM twice, and 30-second CM also twice.

In this program, using the AV data already stored in the broadcast receiving apparatus, the following broadcast services are presented:

1) Re-run Program Service

A re-run service of drama program (a) at 11:00:00 on Jan. 1, 1999. Without transmitting the data of the drama program (a) again from the broadcast transmitting apparatus, the stored AV data may be reproduced.

2) CM-shortened Broadcast Program Service

A service of broadcasting the CMs with the shortest duration among the CM programs of the same companies (in this embodiment, the companies A, B, C, D) during broadcasting of the drama program (a). This is intended to be viewed the shortened CM broadcast duration when broadcasting the program.

3) CM Priority Order Broadcast Program Service

A service of broadcasting in which the CMs with the higher priority may be viewed in broadcasting of drama program(a). For example, the following services are presented.

3.1) CM Mid-program Broadcasting Service

Broadcast from midst of drama program (a) (on-air start time 10:10:00). The priority order of CM is high in the sequence of broadcasting.

3.2) Longer CM Priority Broadcast Program Service

Priority order is higher in the longer duration of CM programs of each company.

3.3) Shorter CM Priority Broadcast Program Service

Priority order is higher in the shorter duration of CM programs of each company.

To present these broadcast program services, the broadcast transmitting apparatus creates application information, that is, information showing method of use of AV data (such as sequence of use of AV data) in the broadcast program service.

Figure 6:
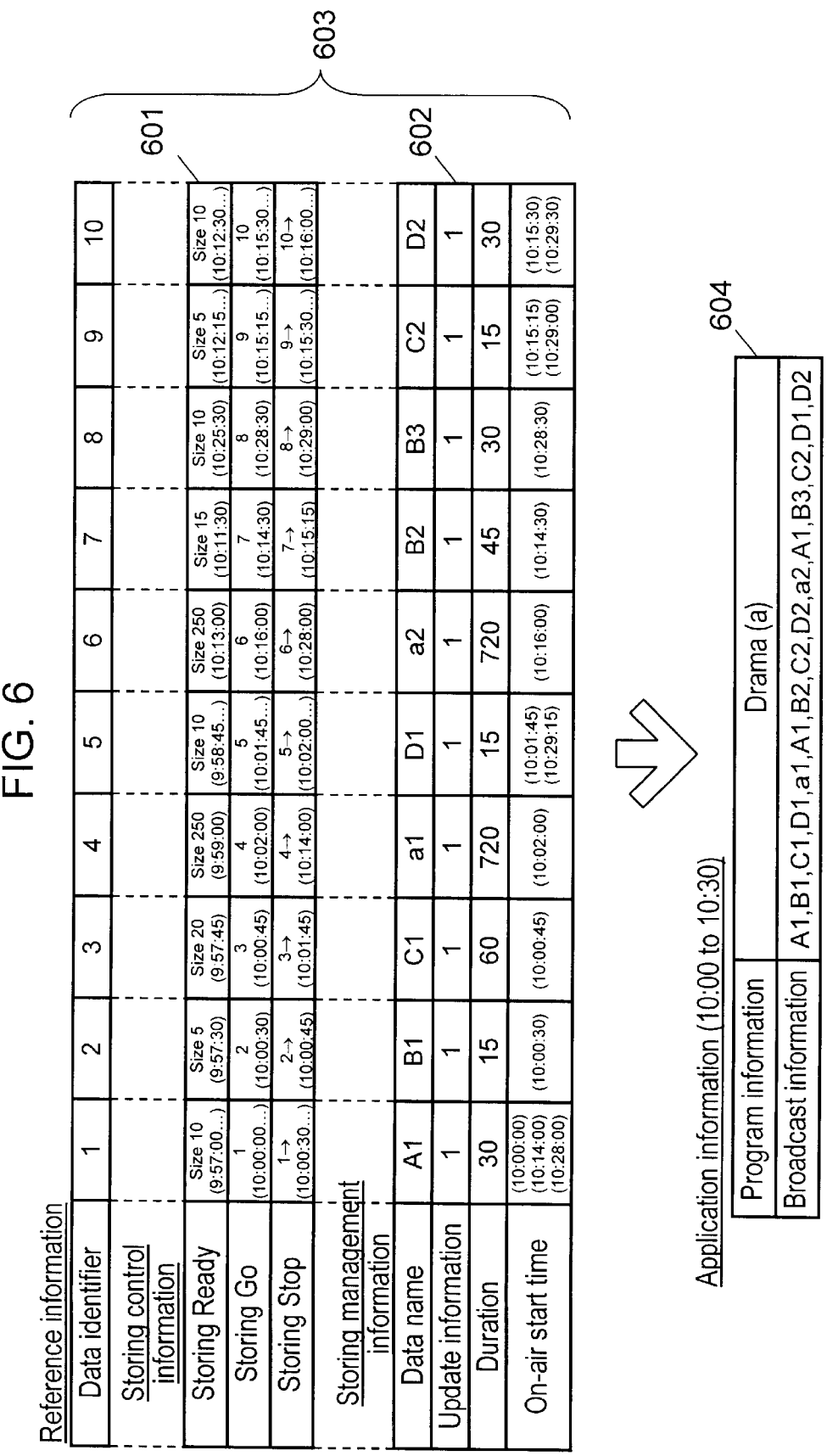
FIG. 6 is a diagram showing data created by application information creating means from reference information of the invention.
Figure 18:
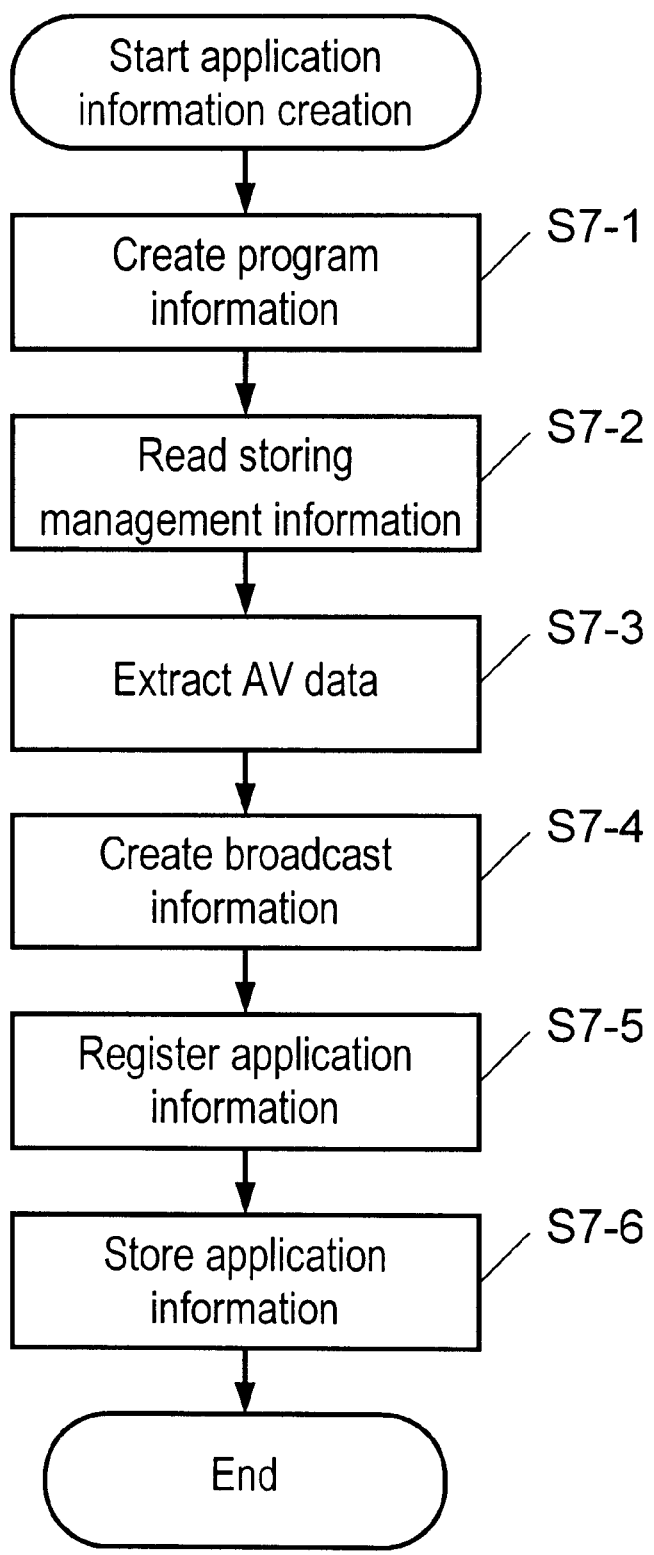
FIG. 18 is a flowchart explaining application information creating process in the fourth embodiment of the invention.

The reference information storing and managing means 104 of the broadcast transmitting apparatus 100 stores and manages, as shown in FIG. 6, storing control information 601 and storing management information 602 created in the reference information creating means 103 as reference information 603, and the application information creating means 105 creates, as shown in FIG. 6, application information composed of program information for specifying the program and broadcast information showing the sequence of the use of the AV data from this reference information 603. This operation is described below while referring to the flowchart in FIG. 18.

Step S7-1: For example, to create program information in application information of broadcast program service of drama program (a) from 10:00 to 10:30 presented by companies A, B, C, D, the information of the program name (drama program (a) in this embodiment) is registered in the application information 604 as program information.

Step S7-2: When creating the program information of the application information, the information of on-air start time is read out from the storing management information 602 registered in the reference information 603.

Step S7-3: The information of the data name of the AV data to be broadcast from 10:00 to 10:30 is read out, and a1, a2, A1, B1, B2, B3, C1, C2, D1, D2 are extracted.

Step S7-4: Searching the broadcasting sequence of the extracted AV data, information of broadcasting sequence composed of A1, B1, C1, D1, a1, A1, B2, C2, D2, a2, A1, B3, C2, D1, D2 is created as broadcast information.

Step S7-5: The created program information and the broadcast information are registered as application information 604 corresponding to the drama program (a) from 10:00 to 10:30.

Step S7-6: The transmitting side application information storing and managing means 106 stores and manages the information 604.

Consequently, from the broadcast transmitting apparatus, the application information and service application are transmitted, and stored in the broadcast receiving apparatus.

Figure 19:
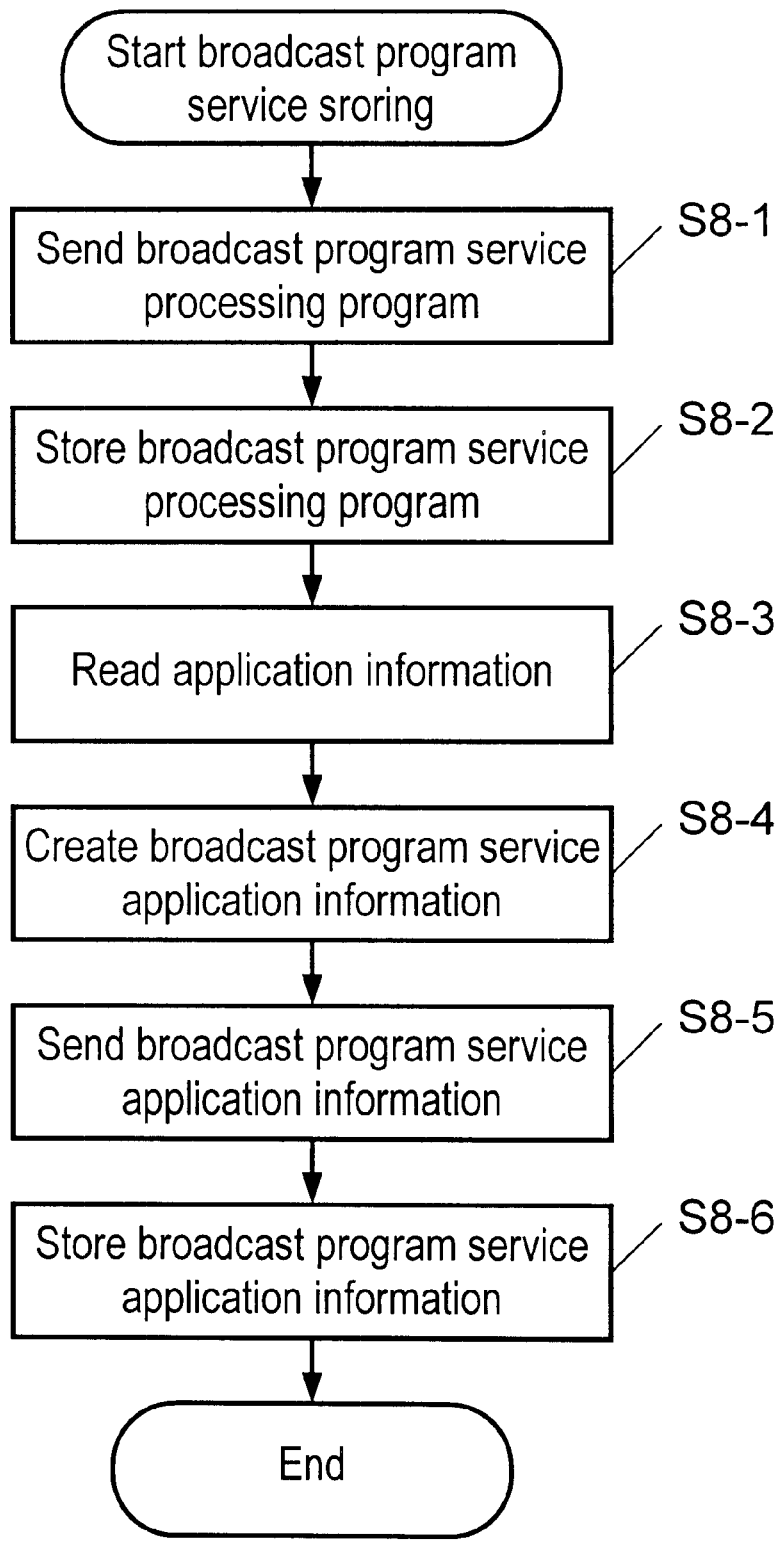
FIG. 19 is a flowchart explaining broadcast program service storing process in the fourth embodiment of the invention.

FIG. 19 is the flowchart showing flow of the process of the receiving apparatus for storing and managing the broadcast program service application information.

As mentioned above, the transmitting side application information storing and managing means 106 of the broadcast transmitting apparatus 100 stores and manages the application information 701 corresponding to the drama program (a) from 10:00 to 10:30 created by the application information creating means 105.

The transmitting side service application storing and managing means 107 of the broadcast transmitting apparatus 100 stores and manages the aforesaid broadcast program service applications 1 to 3.

FIG. 7 shows various types of broadcast program service application information created by the broadcast transmitting apparatus from service information and processing information. The operation to transmit this information from the broadcast transmitting apparatus and to store in the broadcast receiving apparatus is explained below.

Almost all steps in FIG. 19 are the same to all broadcast services. Hence, the same portions are not explained in each broadcast service.

1) Re-run Program Service

Step S8-1: Before executing specified program service, first, the broadcast transmitting apparatus 100 transmits the corresponding broadcast program service application processing program.

Step S8-2: It is stored in the receiving side service application storing and managing means 117 of the broadcast receiving apparatus 110.

Step S8-3: The broadcast transmitting apparatus 100 reads in the application information (701 in FIG. 7) stored and managed in the transmitting side application information storing and managing means 106.

Step S8-4: To re-run a program at 11:00:00 on Jan. 1, 1999, the on-air time of 11:00:00 on Jan. 1, 1999 as processing information and "re-run program service" of broadcast program service name as service information are registered. The broadcast program service information 702 composed of this service information and processing information are added to the application information 701, and re-run program service application information 703 is created, which to be stored in the transmitting side service application storing and managing means 107.

Step S8-5: The broadcast transmitting apparatus 100, then, transmits the corresponding broadcast program service application information 703 to the broadcast receiving apparatus 110.

Step S8-6: It is stored in the receiving side service application storing and managing means 117 of the broadcast receiving apparatus 110.

Meanwhile, in the broadcast receiving apparatus 110, the receiving means 111 can separate the received information into application information and service application, and the application information may be managed by the receiving side application information storing and managing means 116, and the service application may be stored and managed by the receiving side service application storing and managing means 117.

2) CM Shortened Broadcast Program Service

Steps S8-1 to S8-3: Same as above.

Step S8-4. In order to broadcast the CMs with the shortest duration among CM programs of each company (companies A to D), group identifiers A, B, C, D of the companies for broadcasting shortened CM as processing information and "CM shortened broadcast program service" of broadcast program service name as service information are registered. The broadcast program service information 702 composed of this service information and processing information are added to the application information 701, and CM shortened broadcast program service application information 704 is created, which to be stored in the transmitting side service application storing and managing means 107.

Steps S8-5 and S8-6: Same as above.

3) CM Priority Order Broadcast Program Service 3.1) CM Mid-program Broadcasting Service Steps S8-1 to S8-3: Same as above.

Step S8-4: To start broadcast from 10:10:00, with CM broadcast according to the broadcasting sequence, the priority order becomes the broadcasting sequence. The on-air start time 10:10:00 is converted to the broadcast duration of AV data a1 of drama program (a), (10:10:00–10:02:00 (min. of on-air start time of a1))=8 minutes=480 sec is the one-air start time, the processing information is registered, "CM mid-program broadcasting service" of broadcast program service name as service information. The broadcast program service information 702 composed of the service information and processing information are added to the application information 701, and the CM mid-program broadcasting service application information 705 is created and stored in the transmitting side service application storing and managing means 107.

Steps S8-5 and S8-6: Same as above.
3.2) Longer CM Priority Broadcast Program Service
Steps S8-1 to S8-3: Same as above.

Step S8-4: To broadcast in the sequence of the CM with longest duration among CM programs of each company, the group identifiers A, B, C, D of the companies broadcasting shortened CM programs are registered as processing information by ranking the priority order to broadcast from MAX (longest broadcast duration) to MIN (shortest broadcast duration). The "CM long-short time broadcast program service" with the broadcast program service name is registered as service information. The broadcast program service information 702 composed of this service information and processing information are added to the application information 701, and the CM long-short time broadcast program service application information 706 is created and stored in the transmitting side service application storing and managing means 107.

Steps S8-5 and S8-6: Same as above.
3.3) Shorter CM Priority Broadcast Program Service
Steps S8-1 to S8-3: Same as above.

Step S8-4: To broadcast in the sequence of the CM with shortest duration among CM programs of each company, the group identifiers A, B, C, D of the companies broadcasting shortened CM programs are registered as processing information by ranking the priority order to broadcast from MIN (shortest broadcast duration) to MAX (longest broadcast duration). The "CM short-long time broadcast program service" of broadcast program service name is registered as service information. The broadcast program service information 702 composed of this service information and processing information are added to the application information 701, and the CM short-long time broadcast program service application information 707 is created and stored in the transmitting side service application storing and managing means 107.

Steps S8-5 and S8-6: Same as above.

The following is the operation in which the broadcast receiving apparatus broadcasts specified programs by using already stored and managed AV data, broadcast program service application processing program, and broadcast program service application information.

Figure 8:
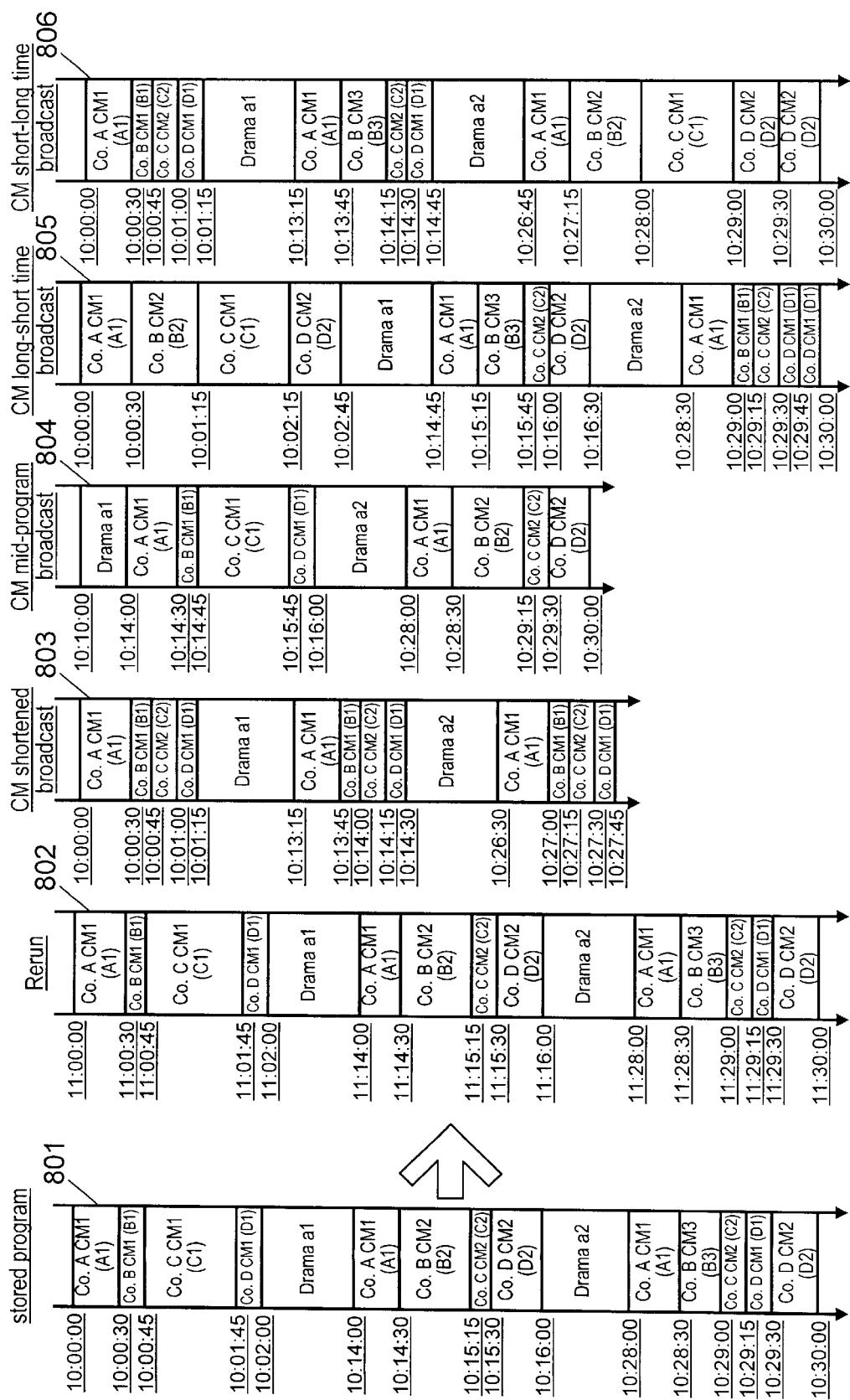
FIG. 8 is a diagram showing broadcast program service in the fourth embodiment of the invention.
Figure 20:
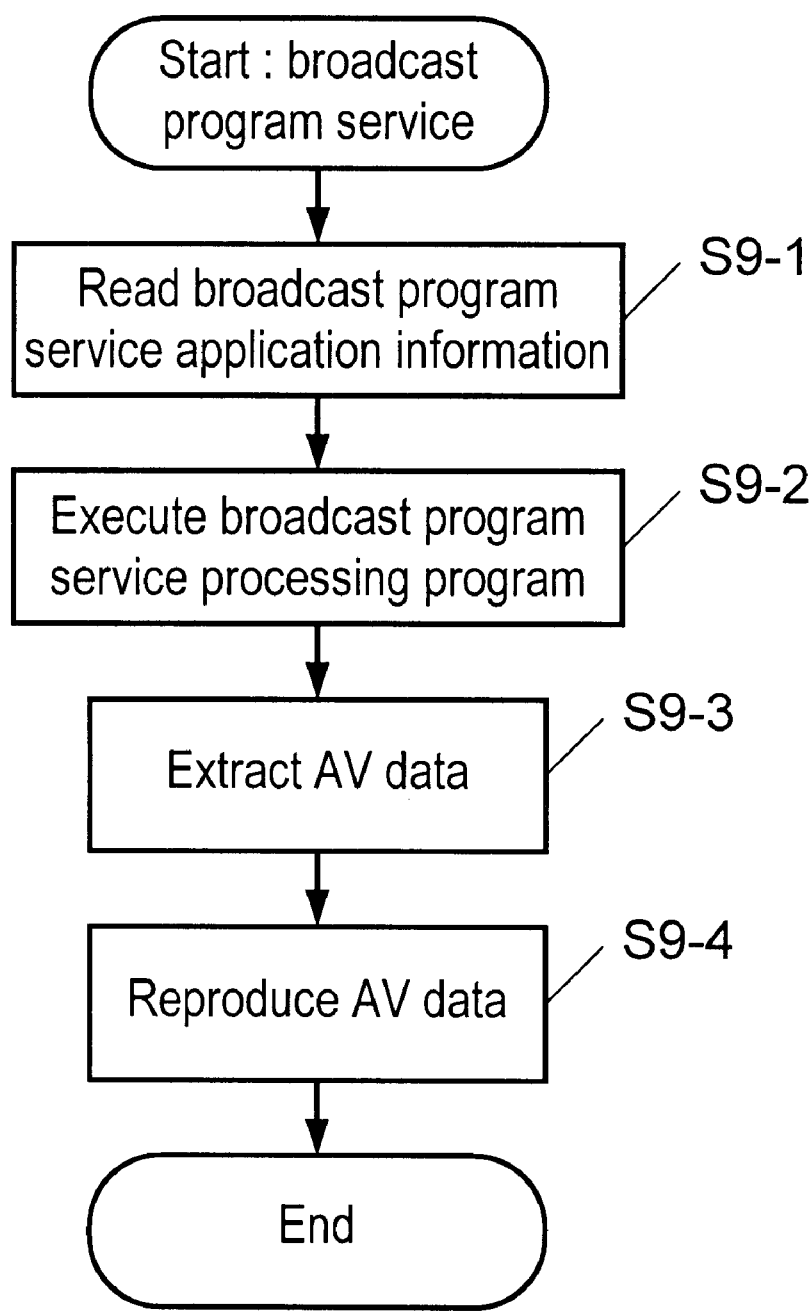
FIG. 20 is a flowchart explaining broadcast program service process in the fourth and fifth embodiment of the invention.

FIG. 20 is the flowchart showing flow of the process in which the broadcast receiving apparatus executes a broadcasting service by using the stored AV data in accordance with application information. FIG. 8 shows various examples of broadcast program service presented at the receiving side, in which reference numeral 801 is a program organization initially received and stored and 802 to 806 are program organizations of various broadcast program services. The operation is described below by referring to FIGS. 1 and 7 as well.

Various broadcast program services are described in detail below.
1) Re-run Program Service Step S9-1: The application information processing means 118 of the broadcast receiving apparatus 110 reads in the re-run program service application information 703 stored and managed in the receiving side service application storing and managing means 117.

Step S9-2: The re-run program service application processing program is executed according to the service information when reaching 11:00:00, Jan. 1, 1999, according to the on-air time registered as processing information.

Step S9-3: The re-run program service application processing program extracts Al, B1, C2, D1, a1, A1, B1, C2, D1, a2, A1, B1, C2, and D1 from the AV data stored and managed in the AV data storing and managing means 114 according to the broadcast information of the re-run program service application information 703.

Step S9-4: As shown in re-run 802, FIG. 8, when AV data A1, B1, C2, D1, a1, A1, B1, C2, D1, a2, A1, B1, C2, and D1 are reproduced sequentially, the program can be re-run without transmitting data of the drama program (a) again from the broadcast transmitting apparatus.
2) CM Shortened Broadcast Program Service Step S9-1: The application information processing means 118 of the broadcast receiving apparatus 110 reads in the CM shortened broadcast program service application information 704 stored and managed in the receiving side service application storing and managing means 117.

Step S9-2: The CM shortened broadcast program service application processing program is executed according to the service information.

Step S9-3: The CM shortened broadcast program service application processing program extracts A1, B1, C2, D1, a1, A1, B1, C2, D1, a2, A1, B1, C2, and D1 from the AV data stored and managed in the receiving side AV data storing and managing means 114 according to the broadcast information of the CM shortened broadcast program service application information 704.

Step S9-4: As shown in CM shortened broadcast 803, FIG. 8, from the AV data having group identifiers A, B, C, D of the companies presenting CM registered in the processing information of the CM shortened broadcast program service application information 704, A1, B1, C2, and D1 of shortest duration are extracted, and by broadcasting in the sequence of A1, B1, C2, D1, a1, A1, B1, C2, D1, a2, A1, B1, C2, and D1, the entire broadcast duration is shortened, and the CM may be also viewed.
3) CM Priority Order Broadcast Program Service
  3.1) CM Mid-program Broadcasting Service Step S9-1: The application information processing means 118 of the broadcast receiving apparatus 110 reads in the CM mid-program broadcasting service application information 705 stored and managed in the receiving side service application storing and managing means 117.

Step S9-2: The CM mid-program broadcasting service application processing program is executed in accordance with the on-air time registered as processing information and the service information from 480 sec of drama al.

Step S9-3: The CM mid-program broadcasting service application processing program extracts A1, B1, C2, D1, a1, A1, B1, C2, D1, a2, A1, B1, C2, and D1 from the AV data stored and managed in the receiving side AV data storing and managing means 114 according to the broadcast information of the CM mid-program broadcasting service application information 705.

Step S9-4: As in CM mid-program broadcast 804 in FIG. 8, broadcast is started from 480 sec of the AV data a1 of the drama program (a), A1, B1, C2, D1, a2, A1, B1, C2, and D1 are broadcast in the same sequence referred from the priority order/broadcast sequence registered as the processing information of CM mid-program broadcasting service application information 705, CM is broadcast from the CM with higher priority order.
  3.2) Longer CM Priority Broadcast Program Service Step S9-1: The application information processing means 118 of the broadcast receiving apparatus 110 reads in the longer CM priority broadcast program service application information 706 stored and managed in the receiving side service application storing and managing means 117.

Step S9-2: The longer CM priority broadcast program service application processing program is executed according to the service information.

Step S9-3: The longer CM priority broadcast program service application processing program extracts A1, B1, C2, D1, a1, A1, B1, C2, D1, a2, A1, B1, C2, and D1 from the AV data stored and managed in the receiving side AV data storing and managing means 114 according to the broadcast information of the longer CM priority broadcast program service application information 706.

Step S9-4: As in longer CM priority broadcast 805 in FIG. 8, according to the priority order registered in the processing information of the longer CM priority broadcast program service application information 706, by broadcasting in the sequence of A1, B2, C1, D2, a1, A1, B3, C2, D2, a2, A1, B1, C2, D1, D1 sequentially from the AV data of the longest broadcast duration among the AV data having group identifiers A, B, C, D of the companies presenting CM, the CM broadcast of broadcast program can be viewed preferentially from the CM with the longest broadcast duration of a company.

3.3) Shorter CM Priority Broadcast Program Service

Step S9-1: The application information processing means 118 of the broadcast receiving apparatus 110 reads in the shorter CM priority broadcast program service application information 707 stored and managed in the receiving side service application storing and managing means 117.

Step S9-2: The shorter CM priority broadcast program service application processing program is executed according to the service information.

Step S9-3: The shorter CM priority broadcast program service application processing program extracts A1, B1, C2, D1, a1, A1, B1, C2, D1, a2, A1, B1, C2, and D1 from the AV data stored and managed in the receiving side AV data storing and managing means 114 according to the broadcast information of the shorter CM priority broadcast program service application information 707.

Step S9-4: As in shorter CM priority broadcast 806 in FIG. 8, according to the priority order registered in the processing information of the shorter CM priority broadcast program service application information 707, by broadcasting in the sequence of A1, B1, C2, D1, a1, A1, B3, C2, D1, a2, A1, B2, C1, D2, D2 sequentially from the AV data of the shortest broadcast duration among the AV data having group identifiers A, B, C, D of the companies presenting CM, the CM broadcast of broadcast program can be viewed preferentially from the CM with the shortest broadcast duration of a company.

Thus, the broadcast transmitting apparatus of the embodiment creates application information from the stored and managed reference information, and transmits it together with the service application for executing broadcast program service. Then, the broadcast receiving apparatus receiving them extracts the corresponding AV data from the stored and managed AV data according to the application information, and executes the service application.

Accordingly, the broadcast transmitting apparatus can present the broadcast program service by making use of the AV data stored and managed in the broadcast receiving apparatus. Therefore, the broadcast program service at the broadcast receiving apparatus can be managed by the broadcast transmitting apparatus.

In this embodiment, as the broadcast program service to be presented, CM broadcast program service is used as an example, but not limited to this. Other service may be similarly executed as far as the service is specified by service application and the information for making use of AV data of broadcast program is presented by application information.

The program name registered in the program information is used in this exemplary, but not limited to this. Other information may be used as far as the program can be specifically identified.

In this exemplary, the data names in the AV data is used to register the broadcasting sequence. Any other information which is cable of uniquely identifying the AV data and expressing the content of the broadcast program can be used as well.

In the embodiment, the information registered in the broadcast program service application information by the broadcast transmitting apparatus includes program information, broadcast information, service information, and processing information Other information may be utilized as long as the information is capable of executing the service in the broadcast receiving apparatus.

Fifth Exemplary Embodiment

A fifth exemplary embodiment relates to an operation of deleting AV data of broadcast program by using the broadcast program service.

For example, suppose to present a service of deleting AV data of first CM of companies A to D as CM delete broadcast program service in a drama program (a) from 10:00 to 10:30.

As explained in the fourth exemplary embodiment, the transmitting side application information storing and managing means 106 of the broadcast transmitting apparatus 100 stores and manages the application information 701 about the drama program (a) from 10:00 to 10:30, created by the application information creating means 105.

The transmitting side service application storing and managing means 107 of the broadcast transmitting apparatus 100 stores and manages the CM delete broadcast program service application.

First, the operation of the broadcast transmitting apparatus for creating service information and processing information as CM delete broadcast program service application information, and storing in the broadcast receiving apparatus is explained below by referring to the flowchart in FIG. 19 and FIGS. 1 and 7.

Step S8-1: To present CM delete broadcast program service in the drama program (a) from 10:00 to 10:30, same as in the fourth exemplary embodiment, before executing the CM delete broadcast program service, the broadcast transmitting apparatus 100 transmits a CM delete broadcast program service application processing program.

Step S8-2: It is stored in the receiving side service application storing and managing means 117 of the broadcast receiving apparatus 110.

Step S8-3: As shown in FIG. 7, the broadcast transmitting apparatus 100 reads in the application information 701 stored and managed in the transmitting side application information storing and managing means 106.

Step S8-4: To delete AV data of first CM of companies A to D, information A1, B1, C1, D1 of data name of AV data is registered as processing information. And the broadcast program service name "CM delete broadcast program service information" is registered as service information also. Then broadcast program service information 702 composed of this service information and processing information are added to the application information 701, and CM delete broadcast program service application information 708 is created, and stored in the transmitting side service application storing and managing means 107.

Step S8-5: Before execution of CM delete broadcast program service, the broadcast transmitting apparatus 100 transmits CM delete broadcast program service application information 708.

Step S8-6: It is stored in the receiving side service application storing and managing means 117 of the broadcast receiving apparatus 110.

Next, the operation of the broadcast receiving apparatus for deleting the stored AV data according to the application information is explained by referring to the flowchart in FIG. 20.

Step S9-1: The application information processing means 118 of the broadcast receiving apparatus 110 reads in the CM delete broadcast program service application information 708 stored and managed in the receiving side service application storing and managing means 117.

Step S9-2: The CM delete broadcast program service application processing program is executed according to the service information.

Step S9-3: The CM delete broadcast program service application processing program extracts A1, B1, C2, D1, a1, A1, B1, C2, D1, a2, A1, B1, C2, and D1 from the AV data stored and managed in the receiving side AV data storing and managing means 114, according to the broadcast information of the CM delete broadcast program service application information 708.

Step S9-4: A1, B1, C1, D1 registered in the processing information of the CM delete broadcast program service application information 708 are deleted from the receiving side AV data storing and managing means 114.

Thus, in this embodiment, as the broadcast transmitting apparatus creates and transmits service application information for deleting AV data of broadcast program, the broadcast receiving apparatus executes service application, and extracts and deletes the corresponding AV data from the stored and managed AV data. Thus, the broadcast transmitting apparatus can delete the AV data being stored and managed in the broadcast receiving apparatus.

Accordingly, deletion of AV data being stored and managed in the broadcast receiving apparatus can be controlled at the broadcast transmitting apparatus.

Sixth Exemplary Embodiment

A sixth exemplary embodiment relates to an operation of creating and utilizing the user information of broadcast program service.

Figure 9:
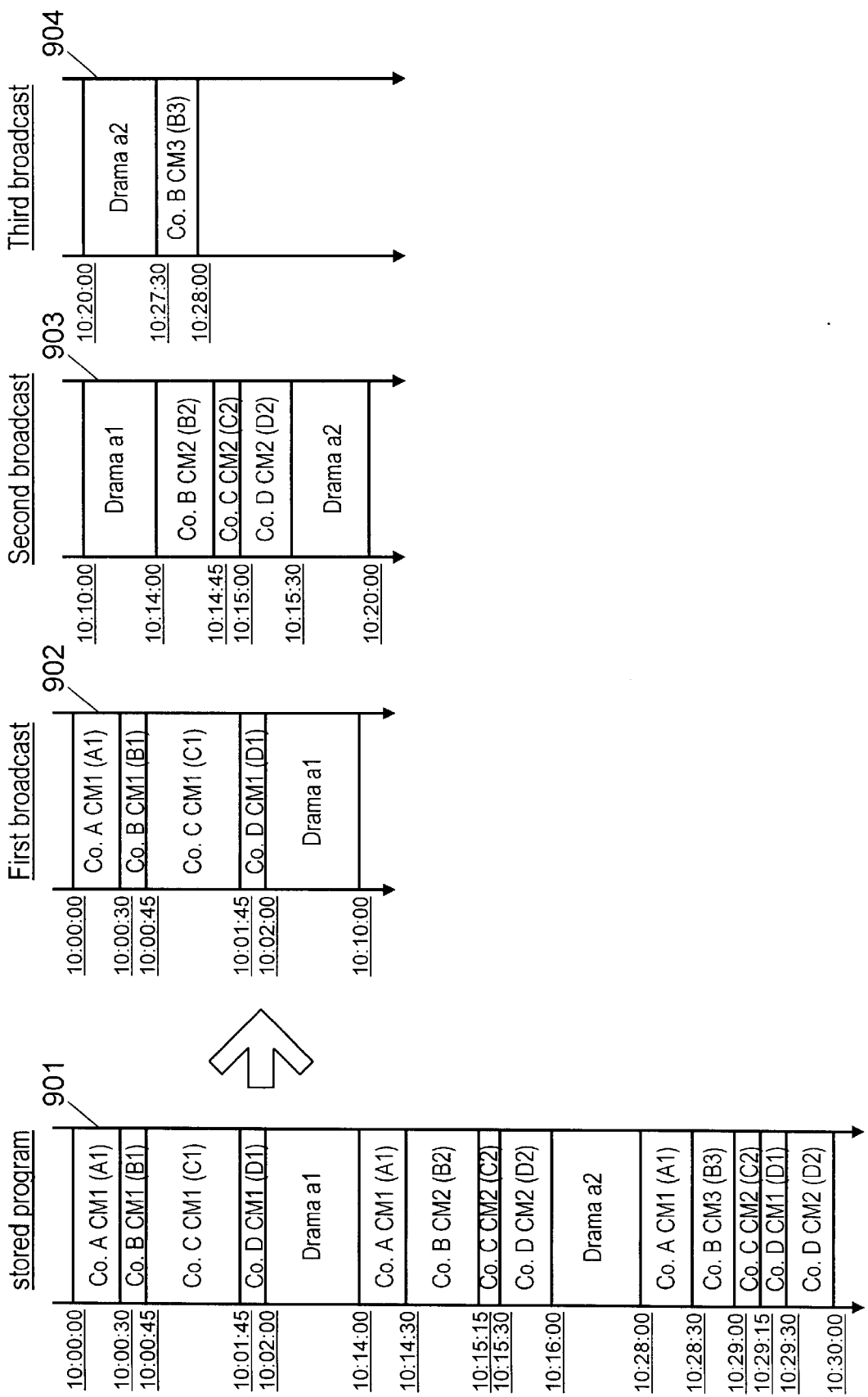
FIG. 9 is a diagram showing broadcast program service in the sixth embodiment of the invention.

For example, when reproducing stored broadcast program in the drama program (a) from 10:00 to 10:30, this is a case of presenting CM one-time reproduction broadcast program service for reproducing the broadcast of a CM only once. FIG. 9 shows a program organization diagram of this program broadcast service.

As explained in the fourth exemplary embodiment, the transmitting side application information storing and managing means 106 of the broadcast transmitting apparatus 100 stores and manages the application information 701 about the drama program (a) from 10:00 to 10:30, created by the application information creating means 105.

The transmitting side service application storing and managing means 107 of the broadcast transmitting apparatus 100 stores and manages the CM one-time reproduction broadcast program service application.

First, the operation of the broadcast transmitting apparatus for creating service information and processing information as CM one-time reproduction broadcast program service application information, and storing in the broadcast receiving apparatus is explained below by referring to the flowchart in FIG. 19.

To present CM one-time reproduction broadcast program service in the drama program (a) from 10:00 to 10:30:

Step S8-1: Same as in the fourth exemplary embodiment, before executing the CM one-time reproduction broadcast program service, the broadcast transmitting apparatus 100 transmits a CM one-time reproduction broadcast program service application processing program.

Step S8-2: It is stored in the receiving side service application storing and managing means 117 of the broadcast receiving apparatus 110.

Step S8-3: As shown in FIG. 7, the broadcast transmitting apparatus 100 reads in the application information 701 stored and managed in the transmitting side application information storing and managing means 106.

Step S8-4: To present CM one-time reproduction broadcast program service, first, as initial values, reproduction start time of 0 (not reproduced) as processing information. The broadcast service name "CM one-time reproduction broadcast program service" is registered as service information. The broadcast program service information 702 composed of this service information and processing information are added to the application information 701. As a result CM one-time reproduction broadcast program service application information 709 is created, and stored in the transmitting side service application storing and managing means 107.

Step S8-5: Before execution of CM one-time reproduction broadcast program service, the broadcast transmitting apparatus 100 transmits CM one-time reproduction broadcast program service application information 709.

Step S8-6: It is stored in the receiving side service application storing and managing means 117 of the broadcast receiving apparatus 110.

Next, the operation of the broadcast receiving apparatus for presenting the broadcast program service by using the stored AV data according to the service application information is explained by referring to the flowchart in FIG. 20 and FIG. 9. Reference numeral 901 in FIG. 9 shows a program organization that has been received and stored for the first time.

Step S9-1: The application information processing means 118 of the broadcast receiving apparatus 110 reads in the CM one-time reproduction broadcast program service application information 709 stored and managed in the receiving side service application storing and managing means 117.

Step S9-2: The CM one-time reproduction broadcast program service application processing program is executed according to the service information.

Step S9-3: The CM one-time reproduction broadcast program service application processing program extracts A1, B1, C1, D1, a1, A1, B2, C2, D2, a2, A1, B3, C2, D1, and D2 from the AV data stored and managed in the receiving side AV data storing and managing means 114, according to the broadcast information of the CM one-time reproduction broadcast program service application information 709.

Step S9-4: As in first broadcast 902 in FIG. 9, referring to the processing information of the CM one-time reproduction broadcast program service application information 709, since the reproduction start time is 0 (not reproduced), the broadcast is reproduced from the beginning in the sequence of A1, B1, C1, D1, a1, A1, B2, C2, D2, a2, A1, B3, C2, D1, and D2.

Figure 21:
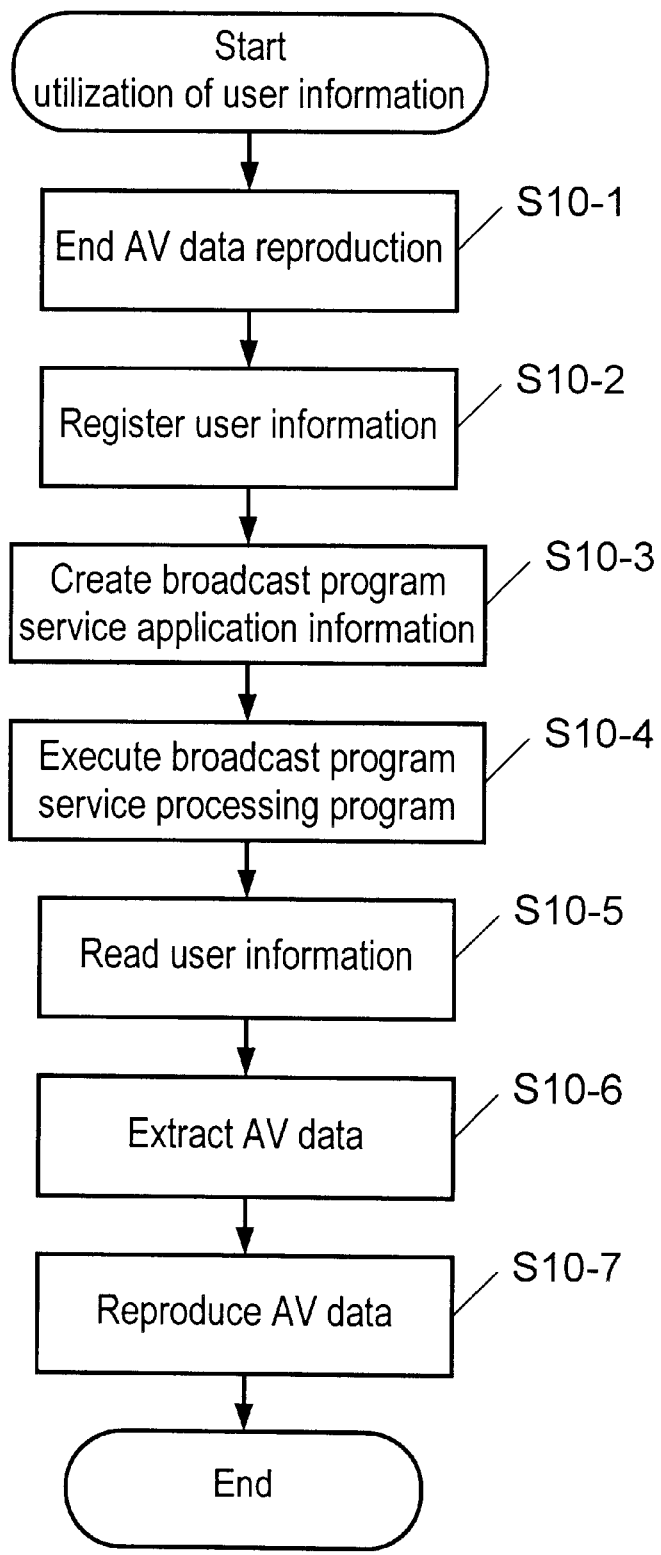
FIG. 21 is a flowchart explaining user information utilizing process in the sixth embodiment of the invention.

FIG. 21 is a flowchart showing the flow of process of operation of the broadcast receiving apparatus for creating and utilizing the user information of broadcast program service, and the operation is described below while referring also to FIGS. 1, 7, and 9 to 11.

Step S10-1: As shown in FIG. 9, in the drama program (a) being on air from 10:00 to 10:30, for example, when the viewer stops viewing at 10:10:00 in the midst of viewing A1, B1, C1, D1, and a1, the CM one-time reproduction broadcast program service application processing program converts the reproduction end time 10:10:00 into the broadcast process time of AV data al of the drama program (a). That is, (10:10:00–10:02:00 (on-air start time of a1)) min.=8 min.=480 sec. is obtained.

Step S10-2: Next, as shown in FIG. 10, in storing management information 1001 of AV data, A1, B1, C1, D1 of sent CM, "the CM one-time reproduction broadcast program service" of broadcast program service name is registered as user information, and storing management information 1002 is created.

Step S10-3: Further, as shown in FIG. 11, in CM one-time reproduction broadcast program service application information 1101, 480 sec converted from the reproduction end time as mentioned above is registered as reproduction start time in processing information, and CM one-time reproduction broadcast program service application information 1102 is created.

Step S10-4: Again, the CM one-time reproduction broadcast program service application processing program is executed.

Step S10-5: Then, the storing management information 1002 registered in the AV data stored and managed in the receiving side AV data storing and managing means 114 is read in.

Step S10-6: From the AV data stored and managed in the receiving side AV data storing and managing means 114, removing A1, B1, C1, D1 having the user information of CM one-time reproduction broadcast program service registered in the storing management information 1002, a1, B2, C2, D2, a2, B3, C2, D2 are extracted according to the broadcast information of the CM one-time reproduction broadcast program service application information 1102.

Step S10-7: As in second broadcast 903 in FIG. 9, referring to the processing information of the CM one-time reproduction broadcast program service application information 1102, since the reproduction start time is 480 of a1, reproduction is started from 480 sec of AV data a1 of the drama program (a), and a1, B2, C2, D2, a2, B3, C2, D2 are reproduced sequentially.

However, again, when the viewer stops viewing at 10:20:00 while reviewing a1, B2, C2, D2, and a2, the CM one-time reproduction broadcast program service application processing program converts the reproduction end time 10:20:00 into broadcast process time of AV data a2 of the drama program (a). That is, (10:20:00–10:15:30 (on-air start time of a2))min=4 minutes 30 seconds=270 sec is obtained (step S10-1).

Next, as shown in FIG. 10, in storing management information 1002 of AV data, B2, C2, D2 of sent CM, "the CM one-time reproduction broadcast program service" of broadcast program service name is registered as user information, and storing management information 1003 is created (step S10-2).

Further, as shown in FIG. 11, in CM one-time reproduction broadcast program service application information 1102, 270 sec converted from the reproduction end time as mentioned above is registered as reproduction start time in processing information, and CM one-time reproduction broadcast program service application information 1103 is created (step S10-3).

Again, the CM one-time reproduction broadcast program service application processing program is executed (step S10-4), and then the storing management information 1003 registered in the AV data stored and managed in the receiving side AV data storing and managing means 114 is read in (step S10-5).

From the AV data stored and managed in the receiving side AV data storing and managing means 114, removing A1, B1, C1, D1, B2, C2, D2 having the user information of CM one-time 20 reproduction broadcast program service registered in the storing management information 1003, a2 and B3 are extracted according to the broadcast information of the CM one-time reproduction broadcast program service application information 1103 (step S10-6).

As in third broadcast 904 in FIG. 9, referring to the processing information of the CM one-time reproduction broadcast program service application information 1103, since the reproduction start time is 270 of a2, reproduction is started from 270 sec of AV data a2 of the drama program (a), and a2 and B3 are reproduced sequentially (step S10-7).

Thus, in the embodiment, the user information of the service application is registered in the storing management information of the AV data stored and managed in the broadcast receiving apparatus, and the service application is executed according to this user information. Hence, the AV data stored and managed in the broadcast receiving apparatus can be utilized efficiently depending on the situation of use of the service application.

In the embodiment, meanwhile, as the user information registered in the storing management information of AV data, the service name is registered, but not limited to this, any other information capable of specifically identifying the service can be used similarly.

Seventh Exemplary Embodiment

A seventh exemplary embodiment relates to an operation of deleting AV data of broadcast program by utilizing the user information of broadcast program service.

For example, in the CM one-time reproduction broadcast program service described in the sixth exemplary embodiment, when the second broadcast is terminated, the sent CM is deleted, that is, a case of presenting a sent CM delete broadcast program service is explained below.

First of all, the operation of the broadcast transmitting apparatus for creating service application information is described by referring to the flowchart in FIG. 19.

As explained in the fourth exemplary embodiment, the transmitting side application information storing and managing means 106 of the broadcast transmitting apparatus 100 stores and manages the application information 701 about the drama program (a) from 10:00 to 10:30, created by the application information creating means 105.

The transmitting side service application storing and managing means 107 of the broadcast transmitting apparatus 100 stores and manages the sent CM delete broadcast program service application.

For example, the broadcast transmitting apparatus creates service information and processing information as the sent CM delete broadcast program service application information, and stores in the broadcast receiving apparatus information, in the following operation.

Step S8-1: To present the sent CM delete broadcast program service in the drama program (a) from 10:00 to 10:30, same as in the fourth exemplary embodiment, before executing the sent CM delete broadcast program service, the broadcast transmitting apparatus 100 transmits a sent CM delete broadcast program service application processing program.

Step S8-2: It is stored in the receiving side service application storing and managing means 117 of the broadcast receiving apparatus 110.

Step S8-3: As shown in FIG. 7, the broadcast transmitting apparatus 100 reads in the application information 701 stored and managed in the transmitting side application information storing and managing means 106.

Step S8-4: To delete AV data of sent CM of companies A to D, group identifiers A, B, C, D representing companies presenting CM of AV data as processing information, at first the broadcast service name of "sent CM delete broadcast program service" is registered as the service information. Then the broadcast program service information 702 composed of this service information and processing information are added to the application information 701. As a result sent CM delete broadcast program service application information 710 is created, and stored in the transmitting side service application storing and managing means 107.

Step S8-5: Before execution of sent CM delete broadcast program service, the broadcast transmitting apparatus 100 transmits sent CM delete broadcast program service application information 710.

Step S8-6: It is stored in the receiving side service application storing and managing means 117 of the broadcast receiving apparatus 110.

Figure 22:
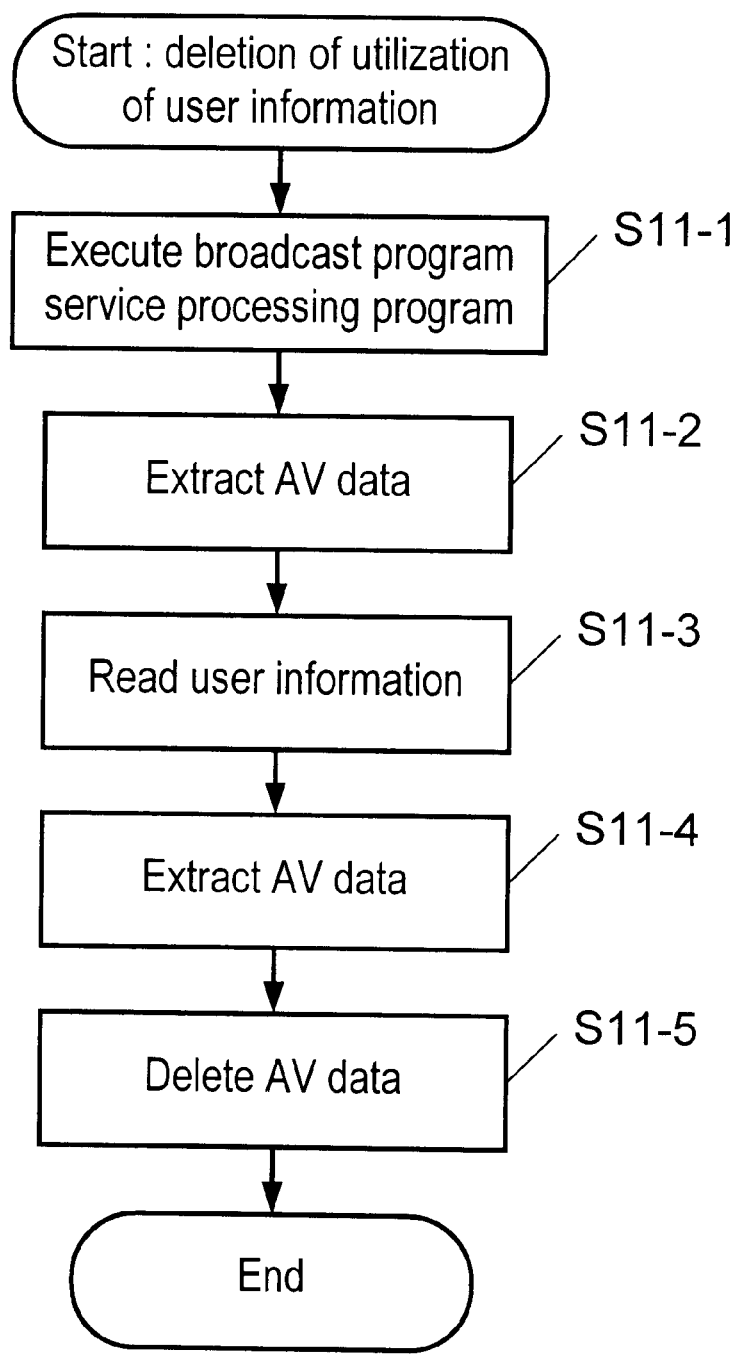
FIG. 22 is a flowchart explaining user information utilization deleting process in the seventh embodiment of the invention.

Next, the operation of the broadcast receiving apparatus for deleting the AV data of broadcast program by using the user information of broadcast program service according to the application information is described below. FIG. 22 is a flowchart showing the flow of process of the operation of the broadcast receiving apparatus for deleting the stored AV data by utilizing the user information of the broadcast program service according to the application information.

Step S11-1: For example, in order to execute the sent CM delete broadcast program service when the second broadcast is terminated in the CM one-time reproduction broadcast program service explained in the sixth exemplary embodiment, the application information processing means 118 of the broadcast receiving apparatus 110 reads in the sent CM delete broadcast program service application information 710 stored and managed in the receiving side service application storing and managing means 116, and executes the sent CM delete broadcast program service application processing program according to the service information.

Step S11-2: The sent CM delete broadcast program service application processing program extracts A1, B1, C1, D1, a1, A1, B2, C2, D2, a2, A1, B3, C2, D1, and D2 from the AV data stored and managed in the receiving side AV data storing and managing means 114, according to the broadcast information of the sent CM delete broadcast program service application information 710.

Step S11-3: Referring to the user information registered in the storing management information 1003 of AV data, Step S11-4: From A1, B1, C1, a1, D1, a2, B2, C2, and D2 in which the user information is registered, the AV data, A1, B1, C1, D1, B2, C2, and D2 of group identifiers A, B, C, D registered in the processing information of the sent CM delete broadcast program service application information 710 are extracted.

Step S11-5: They are deleted.

Thus, in the embodiment, the AV data stored and managed in the broadcast receiving apparatus is deleted according to the user information of the service application. In the broadcast receiving apparatus, the stored and managed AV data can be deleted efficiently depending on the situation of use of the service application.

In the embodiment, meanwhile, the broadcast transmitting apparatus registers the program information, broadcast information, service information, and processing information in the broadcast program service application information, but the information to be registered is not limited to them alone, and any information capable of executing the service in the broadcasting receiving apparatus can be similarly registered. The information of the AV data to be deleted is specified by the information of group identifier, but not limited to this, any other information can be used as far as the AV data can be identified.

Eighth Exemplary Embodiment

An eighth exemplary embodiment relates to an operation of storing AV data of broadcast program by utilizing broadcast program service.

For example, the following is to explain a case of presenting an automatic tuning storing broadcast program service for starting storing AV data of broadcast program by tuning to a specified channel at a designated time.

Figure 23:
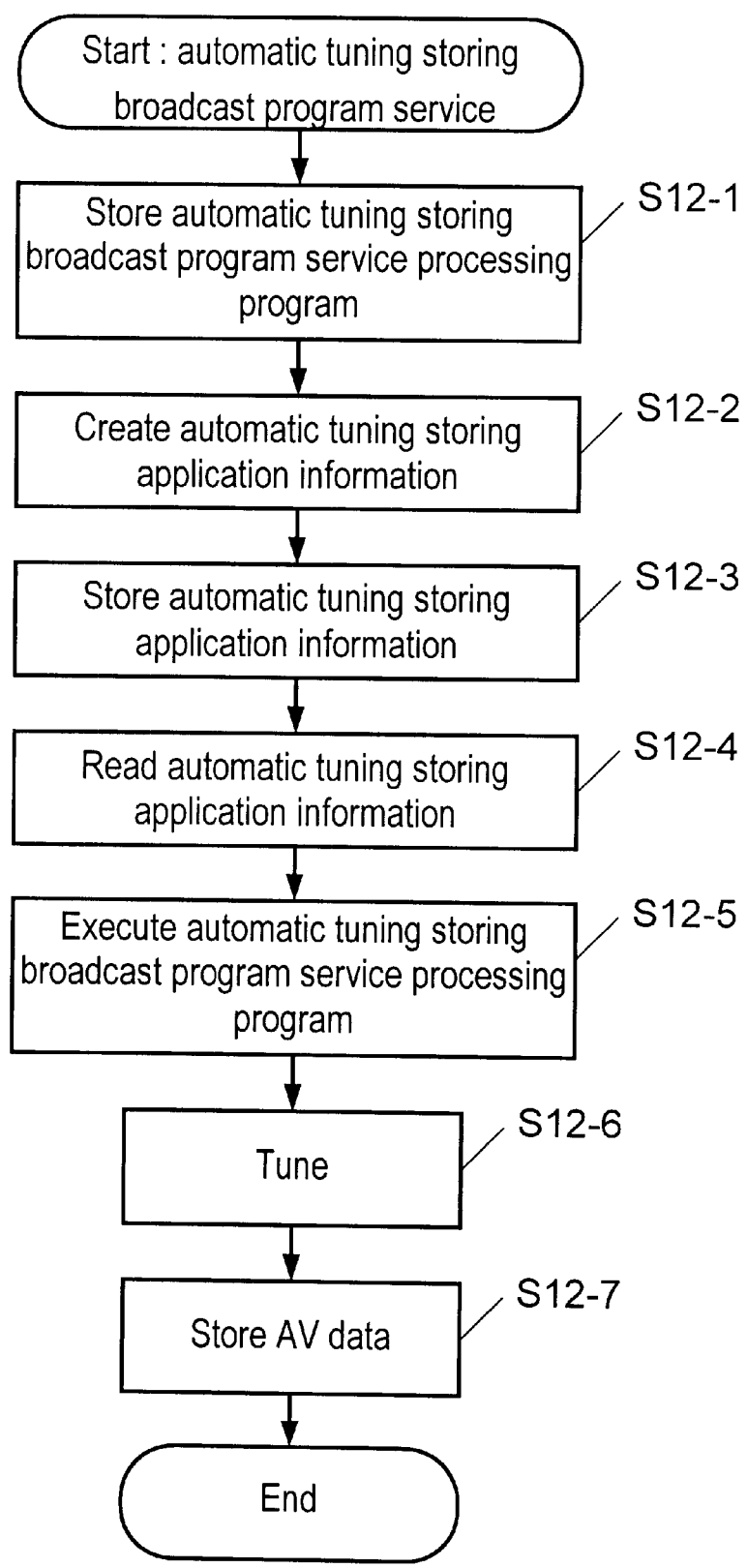
FIG. 23 is a flowchart explaining automatic tuning storing broadcast program service process in a eighth embodiment of the invention.

FIG. 23 is a flowchart showing the process of flow of operation of the broadcast transmitting apparatus and its receiving apparatus for storing AV data of broadcast program by utilizing the stored broadcast program service, and its operation is described below while referring also to FIG. 7.

As explained in the fourth exemplary embodiment, the transmitting side application information storing and managing means 106 of the broadcast transmitting apparatus 100 stores and manages the application information 701 about the drama program (a) from 10:00 to 10:30, created by the application information creating means 105.

The transmitting side service application storing and managing means 107 of the broadcast transmitting apparatus 100 stores and manages the automatic tuning storing broadcast program service application. The broadcast transmitting apparatus creates service information and processing information as the automatic tuning storing broadcast program service application information, and stores in the broadcast receiving apparatus in the following operation.

Step S12-1: To present the automatic tuning storing broadcast program service in the drama program (a) from 10:00 to 10:30, same as in the fourth exemplary embodiment, before executing the automatic tuning storing broadcast program service, the broadcast transmitting apparatus 100 transmits an automatic tuning storing broadcast program service application processing program, and it is stored in the receiving side service application storing and managing means 117 of the broadcast receiving apparatus 110.

Step S12-2: To store automatically the drama program (a) of ch 1 from 10:00:00 to 10:30:00 on Jan. 1, 1999, as shown in FIG. 7, the broadcast transmitting apparatus 100 reads in the application information 701 stored and managed in the transmitting side application information storing and managing means 106, registers the processing information by specifying the tuning channel to be ch 1, and on-air start time to be 10:00:00, Jan. 1, 1999. Further the broadcast program service name of "the automatic tuning storing broadcast program service" is registered as the service information. The broadcast program service information 702 composed of this service information and processing information are added to the application information 701. As a result automatic tuning storing broadcast program service application information 711 is created, and stored in the transmitting side service application storing and managing means 107.

Step S12-3: Before execution of automatic tuning storing broadcast program service, the broadcast transmitting apparatus 100 transmits the automatic tuning storing broadcast program service application information 711, and it is stored in the receiving side service application storing and managing means 117 of the broadcast receiving apparatus 110.

Step S12-4: Consequently, the application information processing means 118 of the broadcast receiving apparatus 110 reads in the automatic tuning storing broadcast program service application information 711.

Step S12-5: The automatic tuning storing broadcast program service application processing program is executed according to the service information.

Step S12-6: The automatic tuning storing broadcast program service application processing program tunes to ch 1 before the on-air time of 10:00:00, Jan. 1, 1999, according to the on-air time registered as processing information in the automatic tuning storing broadcast program service application information 711.

Step S12-7: Thereafter, as explained in the first exemplary embodiment, the AV data of the drama program (a) is stored in the broadcast receiving apparatus 110.

Thus, according to the embodiment, when the application information and service application are transmitted from the broadcast transmitting apparatus, the broadcast receiving apparatus executes the service application according to the application information, tunes to the program automatically, and stores the AV data of the broadcast program. Therefore, in the broadcast receiving apparatus, it seems as if the AV data of the non-tuned broadcast program can be stored.

In the embodiment, the broadcast transmitting apparatus registers the program information, broadcast information, service information, and processing information in the broadcast program service application information, but the information to be registered is not limited to them alone, and any information capable of executing the service in the broadcasting receiving apparatus can be similarly registered.

In the embodiment, meanwhile, the tuning time is before the on-air time, but not limited to this, it may be set and changed freely how far before the on-air start time.

Also in the invention, it is explained to tune in the power ON state of the broadcast receiving apparatus, but not limited to this, once turning off the power, the power may be turned on automatically when reaching the tuning time, and other various free setting or change may be possible.

What is claimed is:

1. A broadcast transmitting apparatus for transmitting a broadcast program composed of AV data containing at least video or audio and reference information, comprising at least:

a) means for storing and managing AV data, for storing and managing broadcast program materials including at least any one of video data and audio data, and AV data information including at least data identifier for identifying the broadcast program materials, the broadcast program materials, and update information showing a version of broadcast program materials;

b) on-air schedule managing means for managing schedule information as transmit schedule of the broadcast program materials, c) means for creating reference information for creating storage control information as transmit schedule of storage control command for storing the broadcast program materials in a broadcast receiving apparatus by referring to the schedule information managed by the on-air schedule managing means, and storage management information consisting of data name for identifying the broadcast program materials, data size and update information in the broadcast receiving apparatus;

d) means for storing and managing reference information for storing and managing the storage control information and storage management information created by the means for creating reference information; and e) transmitting means for transmitting the broadcast program materials stored and managed by the means for storing and managing AV data according to the schedule information managed by the on-air schedule managing means, and the storage control information corresponding to the broadcast program materials stored and managed by the means for storing and managing reference information simultaneously and also transmitting a storage control command according to the storage control information stored and managed by the means for storing and managing reference information.

2. A broadcast transmitting apparatus comprising:

AV data storing and managing means for storing and managing broadcast program materials including at least any one of video data and audio data, and AV data information including at least data identifier for identifying the broadcast program materials, data size of the broadcast program materials, and update information showing a version of broadcast program materials;

schedule managing means for managing schedule information as transmit schedule of the broadcast program materials, reference information creating means for creating storage control information as transmit schedule of storage control command for storing the broadcast program materials in a broadcast receiving apparatus by referring to the schedule information managed by the schedule managing means, and storage management information consisting of data name for identifying the broadcast program materials, data size and update information in the broadcast receiving apparatus;

reference information storing and managing means for storing and managing the storage control information and storage management information created by the reference information creating means; and transmitting means for transmitting the broadcast program materials stored and managed by the AV data storing and managing means according to the schedule information managed by the schedule managing means, and the storage control information corresponding to the broadcast program materials stored and managed by the reference information storing means simultaneously, and also transmitting a storage control command according to the storage control information stored and managed by the reference information storing and managing means.

3. A broadcast receiving apparatus comprising:

receiving means for receiving broadcast program materials including at least any one of video data and audio data, storage management information consisting at least of data name for identifying the broadcast program materials, data size of the broadcast program materials, and update information showing a version of broadcast program materials, and a storage control command for storing the broadcast program materials;

AV data storing and managing means for storing and managing the broadcast program materials and storage management information received by the receiving means;

reference information processing means for instructing a storage action of the broadcast program materials at a timing conforming to the storage control command received by the receiving means, and instructing to store the broadcast program materials by relating to the storage management information simultaneously received by the receiving means together with the broadcast program materials, to the AV data storing means.

4. The broadcast receiving apparatus of claim 3, wherein said reference information processing means judges whether an updated broadcast program material is received or not on the basis of the update information if the broadcast program material in the same data name as the broadcast program material received by the receiving means is already stored in the AV data storing and managing means, and instructs storage of the corresponding broadcast program material to the AV data storing and managing means only if an updated broadcast program material is received.

5. The broadcast receiving apparatus of claim 4, wherein said reference information processing means judges whether there is a vacant capacity or not for storing the broadcast program material in the AV data storing and managing means on the basis of the data size of the broadcast program material received by the receiving means, and instructs storage of the corresponding broadcast program material to the AV data storing and managing means only if there is a vacancy.

6. A method of broadcast transmitting comprising:

a) storing an AV data which includes
   a broadcast program material including at least any one of a video data and an audio data, and
   an AV data attribute information including at least any one of a data identifier for identifying the broadcast program material, a data size of the broadcast program material, and an update information showing the version of the broadcast program material;

b) storing a transmission schedule information of the broadcast program material, c) creating
   a storage control information which includes a transmitting schedule of a storage control command used for storing the broadcast program materials in a broadcast receiving apparatus, by referring to the transmission schedule information, and
   a storage management information which includes
   a data name having a relationship with the data identifier and identifying the broadcast program material,
   a storing ready including the data size, and
   the update information;

d) storing the storage control information and the storage management information; and e) transmiting
   the broadcast program material stored by the step of storing AV data, according to the transmission schedule information,
   the storage control information corresponding to the broadcast program material simultaneously, and
   the storage control command according to the storage control information.

7. A method of broadcast receiving comprising:

a) receiving
   a broadcast program material including at least any one of a video data and an audio data,
   a storage management information consisting at least of any one of a data name for identifying the broadcast program materials, a storing ready including a data size of the broadcast program material, and an update information showing a version of the broadcast program material, and
   a storage control command used for storing the broadcast program material;

b) storing the broadcast program material and the storage management information received by the step of receiving, with keeping a relationship between the broadcast program material and the storage management information;

c) instructing to the step of storing
   to store the broadcast program material at a timing by confirming the storage control command, and
   to store the broadcast program material by relating to the storage management information simultaneously received together with the broadcast program material.

\* \* \* \* \*